US012692705B2

(12) United States Patent
Lane et al.

(10) Patent No.: US 12,692,705 B2
(45) Date of Patent: *Jul. 28, 2026

(54) COATED ROOFING MATERIALS

(71) Applicant: Owens Corning Intellectual Capital, LLC, Toledo, OH (US)

(72) Inventors: Ozma Lane, Columbus, OH (US); Hai Fu, Pataskala, OH (US); William Smith, Pataskala, OH (US); Daniel Buckwalter, Howard, OH (US); Nardine Abadeer, Columbus, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1093 days.

This patent is subject to a terminal disclaimer.

(21) Appl. No.: 17/829,537

(22) Filed: Jun. 1, 2022

(65) Prior Publication Data

US 2022/0389715 A1     Dec. 8, 2022

Related U.S. Application Data

(60) Provisional application No. 63/196,000, filed on Jun. 2, 2021.

(51) Int. Cl.
*E04D 1/22* (2006.01)
*C04B 26/26* (2006.01)
(Continued)

(52) U.S. Cl.
CPC ................ *E04D 1/22* (2013.01); *C04B 26/26* (2013.01); *E04D 1/20* (2013.01); *E04D 1/26* (2013.01);
(Continued)

(58) Field of Classification Search
None
See application file for complete search history.

(56) References Cited

U.S. PATENT DOCUMENTS

| | | | |
|---|---|---|---|
| 1,494,380 A | 5/1924 | Schutte | |
| 2,263,200 A | 11/1941 | Wheeler et al. | |

(Continued)

FOREIGN PATENT DOCUMENTS

| | | | |
|---|---|---|---|
| AU | 2009245565 A1 | 11/2009 | |
| CA | 2460741 A1 | 4/2003 | |

(Continued)

OTHER PUBLICATIONS

Author Unknown, Pubchem Online, Calcium Stearate (Year: 2022).
(Continued)

*Primary Examiner* — Maria V Ewald
(74) *Attorney, Agent, or Firm* — Calfee, Halter & Griswold LLP

(57) ABSTRACT

A roofing material is provided that includes an asphalt impregnated substrate comprising a first surface defining an upper side of the shingle and an opposed a second surface defining a lower side of the shingle, wherein the substrate includes a headlap portion, a tab portion, and a nail zone situated between the headlap portion and the tab portion; an adhesive on the lower side of the shingle; a plurality of granules embedded in the first asphalt coating, forming a top face that includes the granules and a partially exposed first asphalt coating; and at least one anti-stick coating located on the first surface of the shingle on at least one of the headlap portion and the tab portion.

22 Claims, 15 Drawing Sheets

(51) Int. Cl.

| | |
|---|---|
| *C04B 111/00* | (2006.01) |
| *E04D 1/00* | (2006.01) |
| *E04D 1/20* | (2006.01) |
| *E04D 1/26* | (2006.01) |
| *E04D 1/28* | (2006.01) |

(52) U.S. Cl.
CPC ...... *E04D 1/28* (2013.01); *C04B 2111/00586* (2013.01); *E04D 2001/005* (2013.01)

(56) References Cited

U.S. PATENT DOCUMENTS

| | | | |
|---|---|---|---|
| 2,332,221 A | 10/1943 | Harshberger | |
| 2,438,890 A | 4/1948 | Baskin | |
| 2,833,673 A | 5/1958 | Hart et al. | |
| 2,863,405 A | 12/1958 | Leibrook et al. | |
| 3,042,193 A | 7/1962 | Wendt | |
| 3,045,395 A | 7/1962 | Fasold et al. | |
| 3,138,897 A | 6/1964 | McCorkle | |
| 3,239,992 A | 3/1966 | Hodgson | |
| 3,247,631 A | 4/1966 | Lovness | |
| 3,252,257 A | 5/1966 | Price et al. | |
| 3,813,280 A | 5/1974 | Olszyk et al. | |
| 3,903,340 A | 9/1975 | Shepherd | |
| 4,078,104 A | 3/1978 | Martin | |
| 4,173,489 A | 11/1979 | Crawford et al. | |
| 4,243,426 A | 1/1981 | Marzocchi et al. | |
| 4,447,500 A | 5/1984 | Ferris | |
| 4,992,315 A | 2/1991 | Zickell et al. | |
| 5,082,704 A | 1/1992 | Higgins | |
| 5,240,760 A | 8/1993 | George et al. | |
| 5,382,449 A | 1/1995 | Hedges | |
| 5,756,214 A | 5/1998 | Waldron et al. | |
| 5,996,300 A | 12/1999 | Hamlin | |
| 6,426,309 B1 | 7/2002 | Miller et al. | |
| 6,506,444 B1 | 1/2003 | Mahr et al. | |
| 6,524,682 B1 | 2/2003 | Leavell | |
| 6,531,200 B2 | 3/2003 | Zickell et al. | |
| 6,610,147 B2 | 8/2003 | Aschenbeck | |
| 6,635,140 B2 | 10/2003 | Phillips et al. | |
| 6,701,685 B2 | 3/2004 | Rippey | |
| 6,709,994 B2 | 3/2004 | Miller et al. | |
| 6,887,515 B2 | 5/2005 | Zickell | |
| 6,919,398 B1 | 7/2005 | Born et al. | |
| 6,921,787 B2 | 7/2005 | Bate | |
| 7,183,358 B2 | 2/2007 | Bastelberger et al. | |
| 7,238,408 B2 | 7/2007 | Aschenbeck et al. | |
| 7,375,152 B2 | 5/2008 | Bate | |
| 7,442,270 B2 | 10/2008 | Bartek | |
| 7,449,233 B2 | 11/2008 | Arora | |
| 7,452,598 B2 | 11/2008 | Shiao et al. | |
| 7,514,017 B2 | 4/2009 | Bhamidipati | |
| 7,524,545 B2 | 4/2009 | Bany et al. | |
| 7,541,059 B2 | 6/2009 | Aschenbeck et al. | |
| 7,651,559 B2 | 1/2010 | Whitaker et al. | |
| 7,737,057 B2 | 6/2010 | Bany et al. | |
| 7,803,725 B2 | 9/2010 | Payne et al. | |
| 7,805,909 B2 | 10/2010 | Teng et al. | |
| 7,833,339 B2 | 11/2010 | Whitaker et al. | |
| 7,977,259 B2 | 7/2011 | Ratcliff et al. | |
| 8,058,342 B1 | 11/2011 | Stevens et al. | |
| 8,530,034 B2 | 9/2013 | Khan et al. | |
| 8,568,524 B2 | 10/2013 | Li et al. | |
| 8,771,826 B2 | 7/2014 | Whitaker et al. | |
| 9,259,860 B2 | 2/2016 | Kalkanoglu et al. | |
| 9,446,568 B2 | 9/2016 | Larson et al. | |
| 9,511,566 B2 | 12/2016 | Grube et al. | |
| 9,574,350 B2 | 2/2017 | Loftus et al. | |
| 9,670,677 B2 | 6/2017 | Shiao et al. | |
| 9,700,915 B2 | 7/2017 | Ruda | |
| 9,834,626 B2 | 12/2017 | Chisholm et al. | |
| 9,850,623 B2 | 12/2017 | Krigstin et al. | |
| 9,970,153 B2 | 5/2018 | Deng et al. | |
| 10,060,132 B2 | 8/2018 | Beerer et al. | |
| 10,113,314 B2 | 10/2018 | Humphreys | |
| 10,458,119 B2 | 10/2019 | Grubka et al. | |
| 10,584,494 B2 | 3/2020 | Wise et al. | |
| 10,697,179 B2 | 6/2020 | Humphreys | |
| 10,865,565 B2 | 12/2020 | Smith et al. | |
| 10,865,566 B2 | 12/2020 | Smith et al. | |
| 10,865,567 B2 | 12/2020 | Smith et al. | |
| 11,124,968 B2 | 9/2021 | Vermilion et al. | |
| 11,136,761 B2 | 10/2021 | Vermilion et al. | |
| 11,359,377 B2 | 6/2022 | Smith et al. | |
| 12,065,835 B2 * | 8/2024 | Fu | B32B 19/02 |
| 12,091,859 B2 * | 9/2024 | Verhoff | E04D 1/20 |
| 2003/0068469 A1 | 4/2003 | Aschenbeck et al. | |
| 2004/0014385 A1 | 1/2004 | Greaves, Jr. et al. | |
| 2004/0206035 A1 | 10/2004 | Kandalgaonkar | |
| 2004/0258883 A1 | 12/2004 | Weaver | |
| 2005/0072110 A1 | 4/2005 | Shiao et al. | |
| 2005/0252141 A1 | 11/2005 | Kerkar et al. | |
| 2005/0260910 A1 | 11/2005 | Brzozowski et al. | |
| 2006/0179767 A1 | 8/2006 | Miller et al. | |
| 2006/0235143 A1 | 10/2006 | Muller et al. | |
| 2006/0240224 A1 | 10/2006 | Khan et al. | |
| 2006/0243388 A1 | 11/2006 | Kubiak et al. | |
| 2007/0044410 A1 | 3/2007 | Kalkanoglu | |
| 2007/0049144 A1 | 3/2007 | Brzozowski et al. | |
| 2007/0224135 A1 | 9/2007 | Liu et al. | |
| 2007/0261337 A1 | 11/2007 | Whitaker et al. | |
| 2008/0011194 A1 | 1/2008 | Mecca et al. | |
| 2008/0044626 A1 | 2/2008 | Aschenbeck et al. | |
| 2008/0060301 A1 | 3/2008 | Wang et al. | |
| 2008/0086970 A1 | 4/2008 | Teng et al. | |
| 2008/0115444 A1 | 5/2008 | Kalkanoglu et al. | |
| 2008/0193778 A1 | 8/2008 | Bakir et al. | |
| 2009/0220743 A1 | 9/2009 | Aschenbeck et al. | |
| 2009/0249728 A1 | 10/2009 | Teng et al. | |
| 2010/0005745 A1 | 1/2010 | Harrington, Jr. | |
| 2010/0098912 A1 | 4/2010 | Snyder et al. | |
| 2010/0151198 A1 | 6/2010 | Khan | |
| 2010/0203290 A1 | 8/2010 | Whitaker et al. | |
| 2010/0236178 A1 | 9/2010 | Loftus et al. | |
| 2010/0291818 A1 | 11/2010 | Youn | |
| 2010/0307087 A1 | 12/2010 | Zoellner | |
| 2011/0072752 A1 | 3/2011 | Aschenbeck et al. | |
| 2011/0139366 A1 | 6/2011 | Belt et al. | |
| 2011/0257295 A1 | 10/2011 | Li et al. | |
| 2011/0265407 A1 | 11/2011 | Bryson | |
| 2011/0283646 A1 | 11/2011 | Vermilion et al. | |
| 2012/0258282 A1 | 10/2012 | Hammond | |
| 2012/0260597 A1 | 10/2012 | Jenkins et al. | |
| 2012/0288678 A1 | 11/2012 | Grube et al. | |
| 2012/0305171 A1 | 12/2012 | Hammond | |
| 2013/0089707 A1 | 4/2013 | Faure | |
| 2013/0122232 A1 | 5/2013 | Hopkins, II | |
| 2013/0122769 A1 | 5/2013 | Brabbs et al. | |
| 2013/0160674 A1 | 6/2013 | Hong et al. | |
| 2013/0167965 A1 | 7/2013 | Cheney et al. | |
| 2013/0171414 A1 | 7/2013 | Shiao et al. | |
| 2014/0272402 A1 | 9/2014 | Dubey et al. | |
| 2015/0175317 A1 | 6/2015 | Imai et al. | |
| 2015/0239005 A1 | 8/2015 | Humphreys | |
| 2015/0240495 A1 | 8/2015 | Vermilion et al. | |
| 2015/0275521 A1 | 10/2015 | Bader et al. | |
| 2016/0186437 A1 | 6/2016 | Harrington et al. | |
| 2016/0244969 A1 | 8/2016 | Beerer et al. | |
| 2016/0369509 A1 | 12/2016 | Leitch et al. | |
| 2017/0029649 A1 | 2/2017 | Ali et al. | |
| 2017/0321423 A1 | 11/2017 | Situ-Loewenstein et al. | |
| 2017/0362830 A1 | 12/2017 | Buckingham et al. | |
| 2018/0051465 A1 | 2/2018 | Grubka et al. | |
| 2018/0087275 A1 | 3/2018 | Canova et al. | |
| 2018/0281017 A1 | 10/2018 | Humphreys et al. | |
| 2018/0291629 A1 | 10/2018 | Humphreys | |
| 2018/0363302 A1 | 12/2018 | Beerer et al. | |
| 2019/0017273 A1 | 1/2019 | Vermilion et al. | |
| 2019/0032337 A1 | 1/2019 | Sipag et al. | |
| 2019/0077700 A1 | 3/2019 | Xu et al. | |
| 2019/0271160 A1 | 9/2019 | Freeborg et al. | |
| 2019/0277028 A1 | 9/2019 | Chevillard et al. | |
| 2021/0164228 A1 | 6/2021 | Fu et al. | |
| 2021/0214944 A1 | 7/2021 | Verhoff et al. | |

(56) References Cited

U.S. PATENT DOCUMENTS

| | | |
|---|---|---|
| 2021/0381240 A1 | 12/2021 | Vermilion et al. |
| 2021/0381241 A1 | 12/2021 | Vermilion et al. |
| 2022/0268025 A1 | 8/2022 | Smith et al. |

FOREIGN PATENT DOCUMENTS

| | | |
|---|---|---|
| CA | 2508484 C | 7/2010 |
| CA | 2759718 A1 | 5/2013 |
| CA | 2559855 C | 5/2015 |
| CA | 2882641 A1 | 8/2015 |
| CA | 2921279 A1 | 8/2016 |
| CA | 2933050 A1 | 12/2016 |
| CA | 2923675 C | 8/2017 |
| CA | 3035791 A1 | 9/2019 |
| CA | 3044450 A1 | 1/2020 |
| CA | 3100855 A1 | 1/2020 |
| CN | 1439683 A | 9/2003 |
| CN | 200958267 Y | 10/2007 |
| CN | 203499128 U | 3/2014 |
| CN | 203654622 U | 6/2014 |
| CN | 105131765 A | 12/2015 |
| CN | 105802410 A | 7/2016 |
| CN | 107177246 A | 9/2017 |
| DE | 102007050727 A1 | 4/2008 |
| EP | 2455560 A2 | 5/2012 |
| GB | 813520 A | 5/1959 |
| GB | 1398895 A | 6/1975 |
| WO | 03031748 A2 | 4/2003 |
| WO | 03044124 A1 | 5/2003 |
| WO | 03097757 A1 | 11/2003 |
| WO | 2004050774 A2 | 6/2004 |
| WO | 2006060714 A1 | 6/2006 |
| WO | 2007078903 A1 | 7/2007 |
| WO | 2007133393 A1 | 11/2007 |
| WO | 2014038701 A1 | 3/2014 |
| WO | 2016082025 A1 | 6/2016 |
| WO | 2016210379 A1 | 12/2016 |
| WO | 2019077604 A1 | 4/2019 |
| WO | 2020006430 A1 | 1/2020 |
| WO | 2020168019 A1 | 8/2020 |

OTHER PUBLICATIONS

Splash Proof, LLC, "What is Splash Proof Nanotechnology Coating?" (2018), 2 pages, retrieved from the internet at: https://splashproofamerica.com/our-product/.

NanoSeal Tile Roof Sealant (2017-2018), 7 pages, retrieved from the internet at: http://nanoseal.com/tile-roof-coating/.

T.T Chau et al., "A review of factors that affect contact angle and implications for flotation practice," Advances in Colloid and Interface Science 150, pp. 106-115 (2009).

* cited by examiner

FIG. 14

COATED ROOFING MATERIALS

CROSS-REFERENCE TO RELATED APPLICATION(S)

This application claims benefits and priority to U.S. Provisional Patent Application No. 63/196,000, filed on Jun. 2, 2021, the entire disclosure of which is incorporated herein by reference.

FIELD

The present disclosure relates to roofing materials. In particular, the present disclosure relates to roofing materials, such as shingles, that include at least one coating located on the top face of the roofing material.

BACKGROUND

Asphalt-based roofing materials, such as roofing shingles and roll roofing, are installed on the roofs of buildings to provide protection from the elements, and in some instances, to give the roof an aesthetically pleasing look. Typically, the roofing material is constructed of a substrate, such as a glass fiber mat or an organic felt, an asphalt coating on the substrate, a decorative/protective layer of granules applied to the asphalt coating on a top face of the substrate, and a layer of sand or other particulate matter (often referred to as "backdust") applied to the asphalt coating on a bottom face of the substrate.

While the asphalt coating on the roofing material typically includes a layer of granules applied to the top face and a layer of backdust applied to the bottom face, roofing materials are still often prone to sticking due to the asphalt coatings. The issue of sticking is particularly prevalent in roofing materials, such as certain shingles when they are stacked for shipping or storage. Sticking may occur in various locations on a shingle depending upon several factors such as the shingle shape and design and arrangement of the stacked shingles. Additionally, shingles often include an adhesive on the bottom surface to bond successive layers of shingles during installation. Accordingly, controlling and preventing the sticking of successive layers roofing materials when they are stacked, packaged, and/or stored for a prolonged period of time is a concern in the industry.

Accordingly, there is an unmet need in the art for roofing materials that overcome one or more of the aforementioned deficiencies.

SUMMARY

Disclosed herein are asphalt-based roofing materials that include a coating on the face of the shingle. To illustrate various aspects of the present disclosure, several exemplary embodiments of asphalt-based roofing materials are provided.

Various aspects of the present inventive concepts are directed to a coated shingle comprising a substrate comprising a first surface defining an upper side of the shingle and an opposed a second surface defining a lower side of the shingle, wherein the substrate includes a headlap portion, a tab portion, and a nail zone situated between the headlap portion and the tab portion; asphalt impregnated within the substrate, such that a first asphalt coating is present on the first surface of the substrate and a second asphalt coating is present on the second surface of the substrate; an adhesive disposed upon the lower side of the shingle; a plurality of granules embedded in the first asphalt coating, forming a top face that includes the granules and a partially exposed first asphalt coating; and at least one anti-stick coating located on the first surface of the shingle on at least one of the headlap portion and the tab portion.

In any of the exemplary embodiments, the coated shingle further includes a primary release section located on the lower side of the coated shingle, where the primary release section comprises a parting agent material, the parting agent material being included on the shingle in an amount from 0.0005 kg/m2 to 1 kg/m$^2$.

In any of the exemplary embodiments, the anti-stick coating is selected from metal salts of fatty acids, silanes, siloxanes, silicones, silicone rubbers, silica nanoparticles, polysilazanes, waxes, styrene-butadiene rubbers (SBR), esters of acrylic polymers, maleated polypropylene, polyolefins, acrylic, acrylic copolymers, vinyl acetates, polyurethanes, acrylated urethanes, fluoropolymers, poly propyl methacrylate, poly propyl methacrylate with fluorosalts, and combinations thereof.

In any of the exemplary embodiments, the anti-stick coating portion of the coated shingle has a lap shear strength less than 50 lbs.

In any of the exemplary embodiments, the coated shingle is a laminated shingle.

In any of the exemplary embodiments, the antistick coating is located on the headlap portion.

In any of the exemplary embodiments, the anti-stick coating is applied to the headlap portion and extends from a first edge of the coated shingle to a second edge of the coated shingle and has a width in the range of 1 cm to 16 cm.

In any of the exemplary embodiments, the anti-stick coating is selected from metal salts of fatty acids, acrylic polymers, maleated polypropylene, polyurethanes, silanes, silicones, siloxanes, and combinations thereof.

In any of the exemplary embodiments, the anti-stick coating at least partially covers the nail zone.

In any of the exemplary embodiments, the anti-stick coating completely covers the nail zone.

In any of the exemplary embodiments, the coated shingle includes a strip of reinforcement material in the nail zone.

In any of the exemplary embodiments, the coated shingle in a coated region exhibits a bond strength to a sealant on a second shingle greater than 3 lbs. of force.

In any of the exemplary embodiments, the anti-stick coating is selected from acrylic polymers, polyurethanes, and combinations thereof.

In any of the exemplary embodiments, the anti-stick coating is a first anti-stick coating located on the headlap portion and a second anti-stick coating is located on the tab, and the first anti-stick coating and the second anti-stick coating are different.

In any of the exemplary embodiments, the anti-stick coating is located on the tab portion.

In any of the exemplary embodiments, the anti-stick coating is clear.

In any of the exemplary embodiments, the anti-stick coating has a surface energy that is in the range of 10 mN/m to 70 mN/m.

In any of the exemplary embodiments, the percent difference in surface energy between the anti-stick coating and the granules is less than 35%.

In any of the exemplary embodiments, the anti-stick coating is selected from acrylic polymers, polyurethanes, and combinations thereof.

In any of the exemplary embodiments, the acrylic polymers are core-shell polymers or self-crosslinking polymers.

In any of the exemplary embodiments, the anti-stick coating at least partially covers the nail zone, and the anti-stick coating the provides a bond strength to a sealant on an adjacent shingle greater than 3 lbs. of force and a lap shear strength less than 50 lbs.

Further exemplary aspects of the present inventive concepts are directed to a stack of coated shingles comprising at least a first coated shingle and a second coated shingle, each coated shingle comprising a substrate comprising a first surface defining an upper side of the shingle and an opposed a second surface defining a lower side of the shingle, wherein the substrate includes a headlap portion, a tab portion, and a nail zone situated between the headlap portion and the tab portion. The coated shingles further include asphalt impregnated within the substrates, such that a first asphalt coating is present on the first surface of the substrate and a second asphalt coating is present on the second surface of the substrate; an adhesive on the lower side of the shingle. A plurality of granules is embedded in the first asphalt coating, forming a top face that includes the granules and a partially exposed first asphalt coating. Additionally, at least one anti-stick coating is located on the first surface of the shingle on at least one of the headlap portion and the tab portion, wherein the first coated shingle and the second coated shingle are oriented in a stack such that the upper side of the first coated shingle is in contact with the upper side of the second coated shingle.

In any of the exemplary embodiments, the first coated shingle and second coated shingle further includes a primary release section located on the lower side of the coated shingle, where the primary release section comprises a parting agent material, the parting agent material being included on the shingle in an amount from 0.0005 kg/m2 to 1 kg/m².

Further exemplary aspects of the present inventive concepts are directed to a coated shingle comprising: a first substrate comprising a headlap portion and a tab portion, the first substrate having opposed top and bottom surfaces and being coated with a first asphalt coating composition; a second substrate having opposed top and bottom surfaces and being coated with a second asphalt coating composition; and an adhesive adhering a portion of the bottom surface of the tab portion of the first substrate to a portion of the top surface of the second substrate, forming a common bond area; a nail zone situated in the common bond area; at least one anti-stick coating located on the first surface of the shingle on at least one of the headlap portion and the tab portion.

Yet further exemplary aspects of the present inventive concepts are directed to a method for stacking coated shingles comprising: (i) providing a plurality of coated shingles, wherein each of the coated shingles comprise: a substrate comprising a first surface defining an upper side of the shingle and an opposed a second surface defining a lower side of the shingle, wherein the substrate includes a headlap portion, a tab portion, and a nail zone situated between the headlap portion and the tab portion; asphalt impregnated within the substrate, such that a first asphalt coating is present on the first surface of the substrate and a second asphalt coating is present on the second surface of the substrate; an adhesive on the lower side of the shingle; a plurality of granules embedded in the first asphalt coating, forming a top face that includes the granules and a partially exposed first asphalt coating; and at least one anti-stick coating located on the first surface of the shingle on at least one of the headlap portion and the tab portion; and at least one release section on the lower side of the shingle; and (ii) stacking the plurality of coated shingles such that the upper side of a first coated shingle in the plurality of coated shingles is in contact with the upper side of a second coated shingle and the lower side of the first coated shingle is in contact with the lower side of a third coated shingle, such that the release section on the first coated shingle is in contact with the adhesive of the third coated shingle.

BRIEF DESCRIPTION OF THE DRAWINGS

FIG. 14 is a graph showing the lap shear of coated and uncoated shingles;

DETAILED DESCRIPTION

Figure 1:
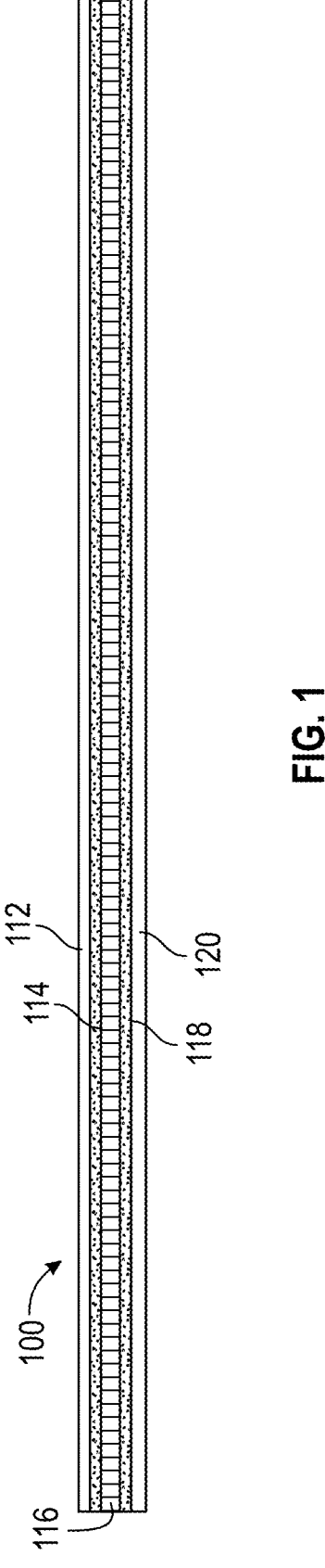
FIG. 1 is a side elevational view of a single layer tabbed shingle.

The general inventive concepts will now be described with occasional reference to the illustrated embodiments thereof. The general inventive concepts may, however, be embodied in different forms and should not be construed as limited to the embodiments set forth herein, nor in any order of preference. Rather, the embodiments are provided so that this disclosure will be more thorough, and will convey the scope of the general inventive concepts to those skilled in the art.

Unless otherwise defined, all technical and scientific terms used herein have the same meaning as commonly understood by one of ordinary skill in the art to which this invention belongs. The terminology used in the description is for describing particular embodiments only and is not intended to be limiting of the general inventive concepts. As used in the description and the appended claims, the singular forms "a," "an," and "the" are intended to include the plural forms as well, unless the context clearly indicates otherwise.

Unless otherwise indicated, all numerical values as used in the description and claims are to be understood as being modified in all instances by the term "about." Accordingly, unless otherwise indicated, the numerical values set forth in the description and claims are approximations that may vary depending on the desired properties sought to be obtained in embodiments of the present disclosure. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Embodiments are based, at least in part, on a shingle that includes at least one anti-stick coating on a surface of the shingle. In any of the exemplary embodiments, the shingle includes at least one asphalt-coated substrate comprising a top surface (which may also be referred to as the face or granule side), and an opposing bottom surface; a plurality of granules embedded in the top surface of the asphalt-coated substrate; and an anti-stick coating applied to the layer of granules. As those skilled in the art will appreciate, as roofing granules have an irregular shape, the asphalt coating is at least partially visible between individual roofing granules embedded in the top surface of the asphalt-coated substrate. In other words, a portion of the asphalt coating is uncovered by granules on the top surface of the shingle. The anti-stick coating on the top surface of the shingle is applied such that it coats at least a portion of the granules and the exposed asphalt coating on the top surface of the shingle. The inclusion of the anti-stick coating on the top surface of the shingle helps to reduce or eliminate shingle-to-shingle sticking when multiple shingles are stacked, for example, during shipping and/or storage. For the purpose of this disclosure, a shingle that includes at least one anti-stick coating on the face of the shingle may be referred to as a "coated shingle." Advantageously, certain anti-stick coatings have been found to reduce face-to-face sticking without deleteriously impacting certain properties such as shingle appearance and/or the bond strength of installed shingles.

The coated shingle may comprise any shingle structure known or commonly used in the art. Based on one or more variables, such as the type of shingle, location of an adhesive or sealant, and the desired stacking orientation, the shingle may have one or more anti-stick coatings in various locations on the face of the shingle. Exemplary ways to orient two or more stacked shingles include orienting adjacently stacked shingles in a front-to-back (i.e., granule side to bottom side) or an alternating front-to-front (i.e., granule side to granule side)/back-to-back (i.e., bottom side to bottom side) configuration. An adhesive or sealant may be placed on the shingles to bond together successive layers of shingles during installation. To prevent the shingle from prematurely adhering to the adhesive or sealant of an adjacent shingle during while stacked, the shingle may also include a release section. The release section may include a section of release tape or parting material located on the coated shingle to prevent the coated shingle from sticking to the adhesive or sealant of an adjacent shingle.

Figure 2:
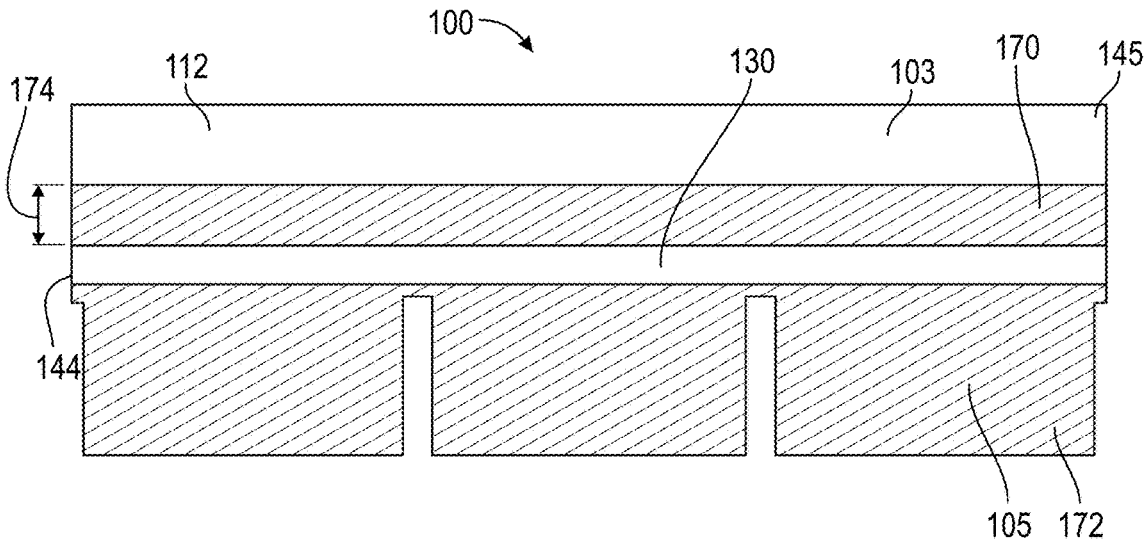
FIG. 2 is a top plan view of the single layer tabbed shingle of FIG. 1.
Figure 3:
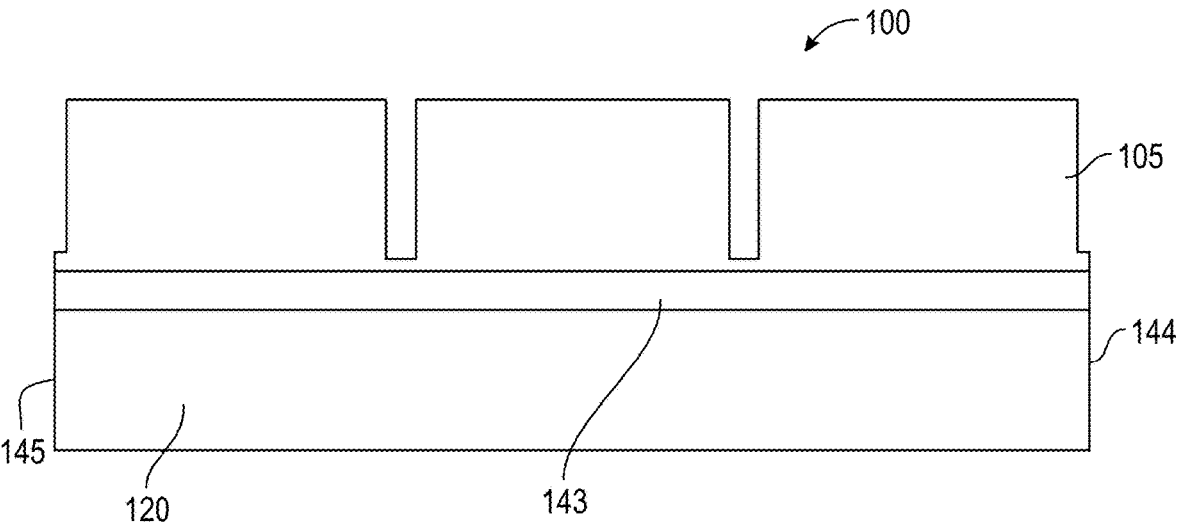
FIG. 3 is a bottom plan view of the single layer tabbed shingle of FIG. 1.
Figure 4:
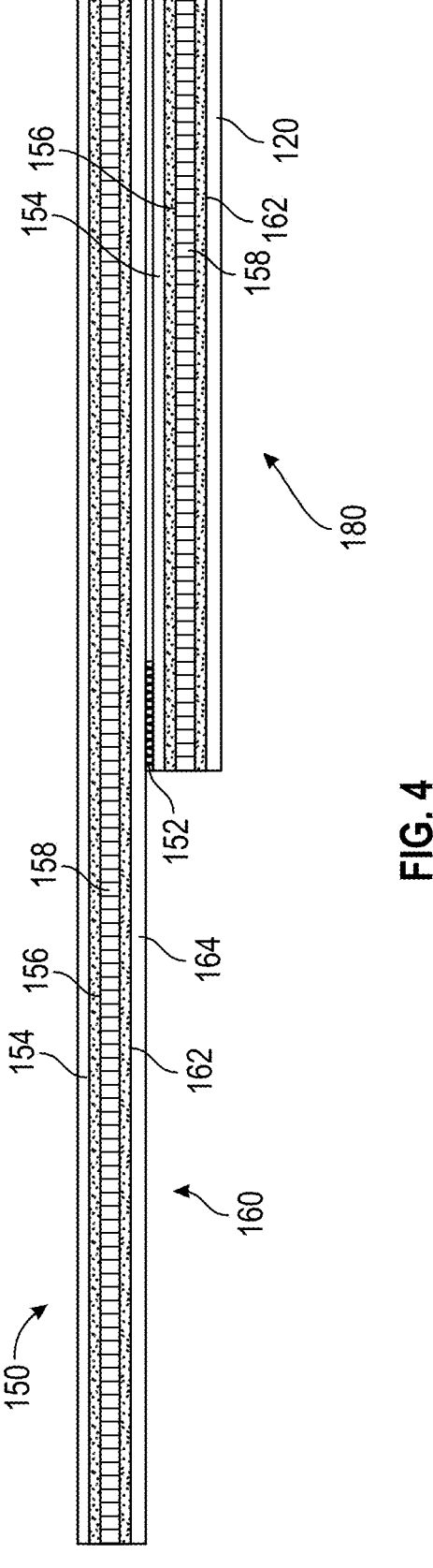
FIG. 4 is a side elevational view of a laminated shingle.

As indicated above, the anti-stick coating may prevent shingles from sticking to each other when stacked. Shingles are generally stacked and packaged for storage and transport (e.g. in a wrapper, bag, box, or the like). Typically, the shingles are stacked in either a front-to-back (i.e. granule side to bottom) or an alternating front-to-front/back-to-back configuration. A bundle of shingles may be prepared that typically includes about 16 to about 22 stacked shingles. Each bundle may be placed inside of a package. The package may take a wide variety of forms, such as a plastic wrapper, a paper wrapper, a plastic bag, shrink wrap, a cardboard box, a polyethylene wrapper In one or more exemplary embodiments, the coated shingle is a single layer tabbed shingle. As illustrated in FIGS. 1, 2, and 3, a single layer tabbed shingle 100 comprises a substrate 116 that is impregnated with asphalt, such that the asphalt extends the entire thickness of the substrate from the top surface to the bottom surface. Thus, the asphalt forms a first asphalt coating 114 on the top surface of the substrate and a second asphalt coating 118 on the bottom surface of the substrate 116. The single layer tabbed shingle 100 also comprises a surface layer of granules 112 embedded in the first asphalt coating 114. A backdust layer of particles 120 may optionally be embedded in the second asphalt coating 118. The first asphalt coating 114 is positioned above the substrate 116 when the shingles are installed on a roof and the second asphalt coating 118 is positioned below the substrate when the shingles are installed on the roof.

Referring now to FIG. 2, a top view of an exemplary single layer tabbed shingle 100 is shown. The single layer tabbed shingle 100 includes a tab portion 105, which is defined by tabs and cutout sections, and a headlap portion 103. The upper surface of the single layer tabbed shingle 100 includes a surface layer of granules 112 on the headlap portion 103 and the tab portion 105. The shingle 100 includes an adhesive 130 applied to a top surface of the headlap portion 103. Adhesive 130 may be an adhesive, sealant, or the like (hereinafter the "adhesive"). In the single layer tabbed shingle 100, the adhesive 130 may be applied to the surface layer of granules 112 on the headlap portion 103. Although the adhesive 130 is shown as a continuous strip on each tab of the single layer tabbed shingle 100, the adhesive 130 may be applied in various forms and configurations including, but not limited to, dots, discontinuous segments, or combinations thereof.

In one or more exemplary embodiments, at least a portion of the upper surface of the shingle 100 is coated with a first anti-stick coating 170. In some exemplary embodiments, the first anti-stick coating 170 is applied to the headlap portion 103 and is located on the surface formed by the surface layer of granules 112 embedded in the first asphalt coating 114. The first anti-stick coating 170 coats the surface layer of granules 112 and the exposed asphalt in the first asphalt coating 114. The first anti-stick coating 170 may comprise a band having a length that spans from a first edge 144 of the single layer tabbed shingle 100 to a second edge 145 of the single layer tabbed shingle 100. The first anti-stick coating 170 may run along or parallel to the edge of the adhesive 130. While shown directly adjacent to the edge of the adhesive 130, the first anti-stick coating 170 is not required to be directly adjacent to the edge of the adhesive 130.

In one or more exemplary embodiments, the distance between the edge of the adhesive 130 and the first anti-stick coating 170 may be in the range of 0 cm to 4 cm, 0.8 cm to 3.2 cm, 1 cm to 2.9 cm, or 1.5 cm to 2.2 cm. The first anti-stick coating 170 further has a width 174. In one or more exemplary embodiments, the width 174 may be in the range of 2 cm to 15 cm, including the range of 3 cm to 13 cm, and 5 to 10 cm. In other exemplary embodiments, the anti-stick coating 170 may cover all or substantially all (e.g., at least 80% of the surface area) of the face of the headlap portion 103.

Additionally, in any of the exemplary embodiments, the anti-stick coating may be applied to the tab portion 105 of the shingle 100, such as in the form of a second anti-stick coating 172 located on the surface formed by the surface layer of granules 112 embedded in the first asphalt coating 114. The second anti-stick coating 172 coats the surface layer of granules 112 and the exposed asphalt in the first asphalt coating 114. The second anti-stick coating 172 may cover all or substantially all (e.g., at least 80% of the surface area) of the face of tab portion 105. While single layer tabbed shingle 100 shows both a first anti-stick coating 170 and a second anti-stick coating 172, the single layer tabbed shingle 100 does not require both anti-stick coatings. Accordingly, the single layer tabbed shingle 100 may include only the first anti-stick coating 170, only the second anti-stick coating 172, or both the first anti-stick coating 170 and the second anti-stick coating 172. Moreover, in some embodiments, the first anti-stick coating 170 and the second anti-stick coating 172 may connect to form a single anti-stick coating.

Referring now to FIG. 3, a bottom view of the single layer tabbed shingle 100 is shown. The bottom surface of the single layer tabbed shingle 100 includes a backdust layer of particles 120 on the headlap portion 103 and the tab portion 105. The single layer tabbed shingle 100 also includes a release section 143 applied to a bottom surface of the headlap portion 103 of the single layer tabbed shingle 100. The release section 143 is a band that includes a length that spans from a first edge 144 of the shingle 100 to a second edge 145 of the single layer tabbed shingle 100. The release section 143, may include a width in the range of 1 cm to 16 cm, 1.5 cm to 12 cm, or 2 cm to 8 cm. The release section 143 may run along or parallel to the edge of the headlap portion 103 that is adjacent the tab portion 105. The release section 143 may be applied directly to the second asphalt coating 118 or the backdust layer of particles 120. As noted above, the release section 143 may be a coating of a parting agent material or a release tape. While shown as a continuous strip, the release section 143 may also be applied to form a design or a pattern.

Alternatively, the coated shingle may comprise a laminated shingle. As illustrated in FIGS. 4, 5, 6, 7, and 8, a laminated shingle 150 comprises an upper or overlay sheet 160 attached to a lower or underlay sheet 180 with an adhesive 152 to form the laminated shingle 150. Similar to the single layer tabbed shingle 100, each sheet generally comprises a substrate 158, a first asphalt coating 156 on the top surface of the substrate 158 that is impregnated with asphalt, such that the asphalt extends the entire thickness of the substrate from the top surface to the bottom surface, a surface layer of granules 154 embedded in the first asphalt coating 156, a second asphalt coating 162 on the bottom surface of the substrate 158, and a backdust layer of particles 164 embedded in the second asphalt coating 162.

Figure 5:
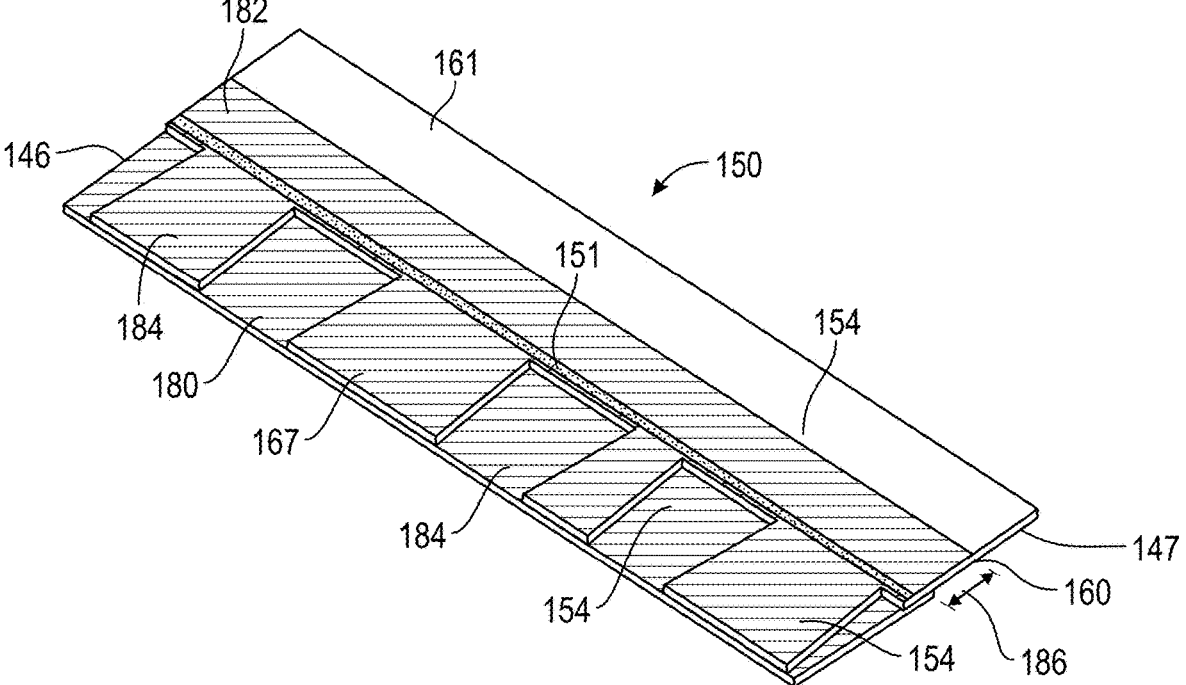
FIG. 5 is a top perspective view of the laminated shingle of FIG. 4.
Figure 6:
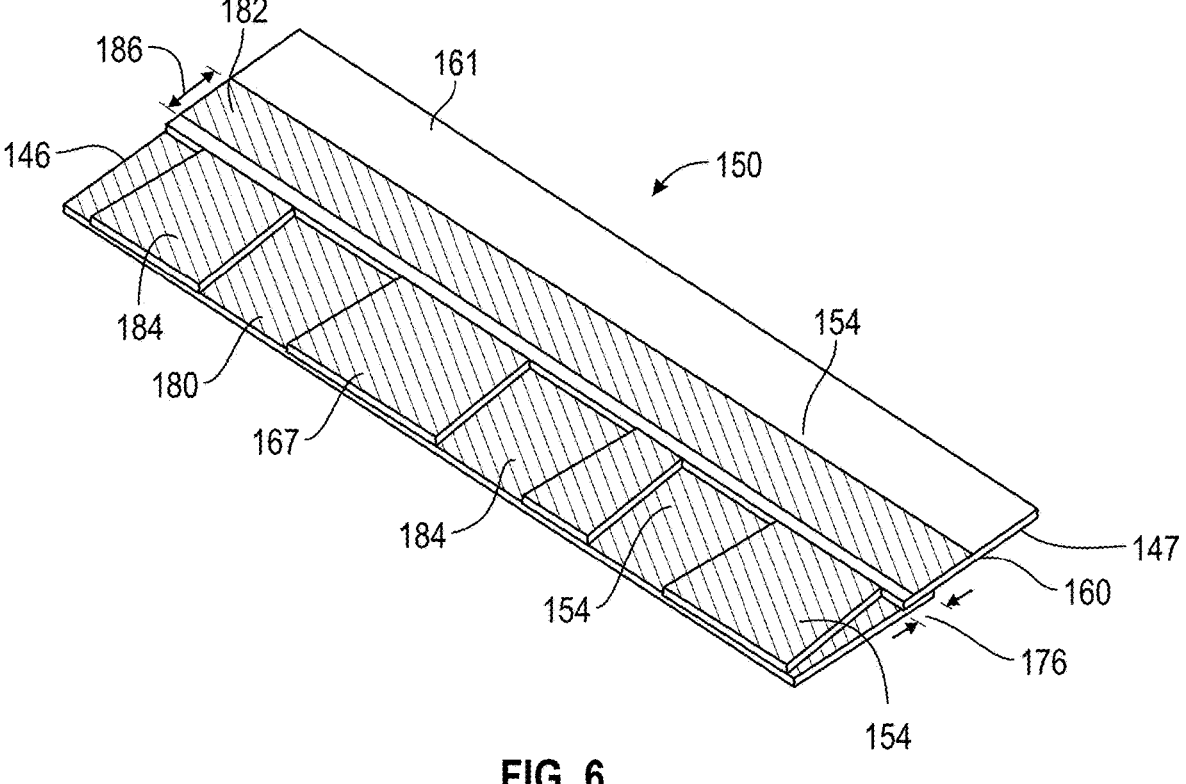
FIG. 6 is a top perspective view of the laminated shingle of FIG. 4.

Referring now to FIG. 5, a top view of the laminated shingle 150 is shown. The overlay sheet 160 includes a tab portion 167, which is defined by tabs and cutout sections, and a headlap portion 161. Depending upon the shape of the tabs and cutout sections, the tab portion 167 may also be referred to in the art as a dragon tooth portion. Through the cutout sections of tab portion 167 the underlay sheet 180 is visible. The upper surface of the headlap portion 161 includes a surface layer of granules 154 and, optionally, a reinforcement layer 151. The reinforcement layer 151 is located in the nail zone of laminated shingle 150. FIG. 6 provides a similar laminated shingle 150, where the reinforcement layer 151 is absent. The upper surfaces of the tab portion 167 (including the underlay sheet 180) have a surface layer of granules 154.

In one or more exemplary embodiments, the headlap portion 161 may include a first anti-stick coating 182 located on the surface formed by the surface layer of granules 154 embedded in the first asphalt coating 156. The first anti-stick coating 182 coats the surface layer of granules 154 and the exposed asphalt in the first asphalt coating 156. The first anti-stick coating 182 may be a band that includes a length that spans from a first edge 146 of the laminated shingle 150 to a second edge 147 of the laminated shingle 150. In one or more exemplary embodiments, where the laminated shingle 150 includes a reinforcement layer 151, the first anti-stick coating 182 may run along or parallel to the edge of the reinforcement layer 151. In one or more exemplary embodiments, where the first anti-stick coating 182 is not directly adjacent to the reinforcement layer 151, the first anti-stick coating 182 may be in the range of 0.01 to 0.5 cm away from the reinforcement layer 151. In other exemplary embodiments, the first anti-stick coating 182 may be coated on top of the reinforcement layer 151. Accordingly, when the first anti-stick coating 182 extends over the reinforcement layer 151, the nail zone of the shingle will be coated. In any of the exemplary embodiments, the anti-stick coating 182 may run along or parallel to the edge of the headlap portion 161 that is adjacent the tab portion 167.

In any of the exemplary embodiments, the first anti-stick coating 182 may be separated from the edge of the headlap portion 161 that is adjacent to the tab portion 167 by a gap 176. Gap 176 may be in the range of 0 cm to 4 cm, 0.8 cm to 3.2 cm, 1 cm to 2.9 cm, or 1.5 cm to 2.2 cm. In any of the exemplary embodiments, the first anti-stick coating 182 may be directly adjacent to the edge of the headlap portion 161 that is adjacent to the tab portion 167. In these embodiments, gap 176 may be 0 or close to 0. The nail zone is adjacent the tab portion 167. Accordingly, when the first anti-stick coating 182 is directly adjacent to the edge of the headlap portion 161 the first anti-stick coating 182 may the nail zone. In other embodiments, the first anti-stick coating 182 extends to at least partially cover the nail zone. In other embodiments, the first anti-stick coating 182 does not cover the nail zone. The first anti-stick coating 182 on laminated shingle 150 has a width 186. In one or more exemplary embodiments, the width 186 may be in the range of 2 cm to 15 cm, including, for example, the range of 3 cm to 13 cm, and/or 5 to 10 cm. In any of the exemplary embodiments, the first anti-stick coating 182 may cover all or substantially all (e.g., at least 80% of the surface area) of the face of the headlap portion 161.

In any of the exemplary embodiments, the tab portion 167 may include a second anti-stick coating 184 located on the surface formed by the surface layer of granules 154 embedded in the first asphalt coating 156. The second anti-stick coating 184 coats the surface layer of granules 154 and the exposed asphalt in the first asphalt coating 156. The second anti-stick coating 184 may cover all or substantially all (e.g., at least 80% of the surface area) of the face of tab portion 167. While laminated shingle 150 shows both a first anti-stick coating 182 and a second anti-stick coating 184, the laminated shingle 150 does not necessarily include both anti-stick coatings. Accordingly, the laminated shingle 150 may include only the first anti-stick coating 182, only the second anti-stick coating 184, or both the first coating 182 and the second coating 184. Moreover, in any of the exemplary embodiments, the first anti-stick coating 182 and the second anti-stick coating 184 may connect to form a single anti-stick coating.

Figure 7:
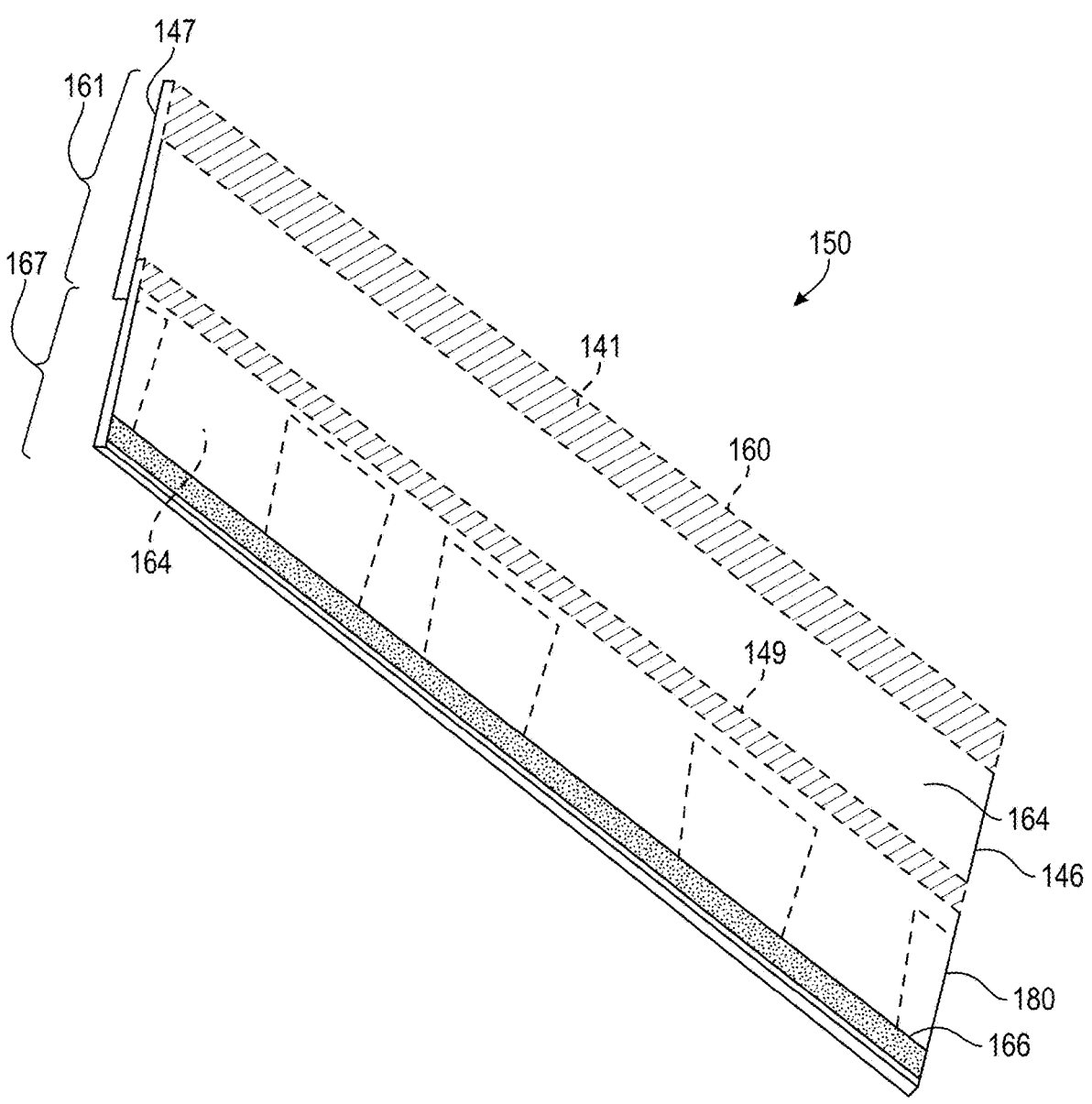
FIG. 7 is a bottom perspective view of the laminated shingle of FIG. 4.
Figure 8:
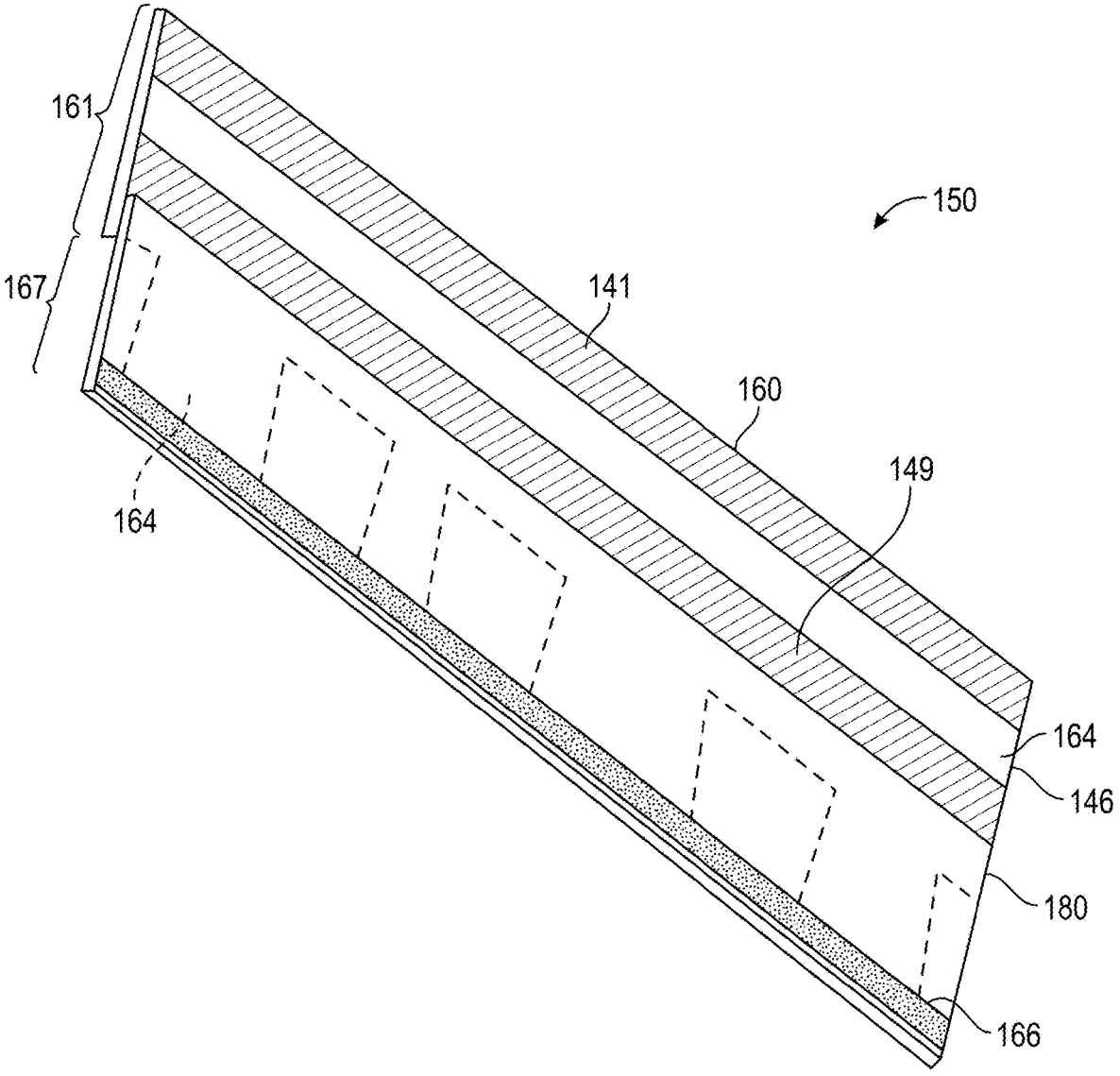
FIG. 8 is a bottom perspective view of the laminated shingle of FIG. 4.

Referring now to FIGS. 7 and 8, a bottom view of the laminated shingle 150 is shown. The laminated shingle 150 includes an adhesive 166 applied to a bottom surface of the tab portion 167 of the laminated shingle 150. Similar to the single layer tabbed shingle 100, the adhesive 166 may be an adhesive, sealant, or the like. Laminated shingle 150 also includes a primary release section 141 applied to a bottom surface of the headlap portion 161 of the laminated shingle 150. The primary release section 141 is a band that includes a length that spans from a first edge 146 of the laminated shingle 150 to a second edge 147 of the laminated shingle 150. The primary release section 141 may include a width of 0.5 cm to 6 cm, including, for example, a width from 0.75 cm to 3.5 cm, or 1 cm to 2.6 cm. The primary release section 141 may run along to the edge of the headlap portion 161 that is opposite the tab portion 167. Alternatively, the primary release section 141 may run parallel to the edge of the headlap portion 161 that is opposite the tab portion 167 such that there is a gap between the primary release section 141 and the edge of the headlap portion 161. The primary release section 141 may be applied to the second asphalt coating 162 or the backdust layer of particles 164. The primary release section 141 may be a release tape or a layer of parting agent material. The laminated shingle 150 also includes a secondary release section 149 on the bottom surface of the underlay sheet 180 of the laminated shingle 150. The secondary release section 149 comprises a band that includes a length that spans from the first edge 146 of the shingle 150 to the second edge 147 of the shingle 150. The secondary release section 149, may include a width of about that extends between 1 cm and 16 cm, including, for example, between 1.5 cm and 12 cm, and between 2 cm and 8 cm.

As shown in FIG. 6, the secondary release section 149 may run along the "common bond area" where the overlay sheet 160 and the underlay sheet 180 overlap. Alternatively, as shown in FIG. 8, the secondary release section 149 may run along the back side of the overlay sheet 160 adjacent to in close proximity (e.g., within 3 cm) to the underlay sheet 180. In other embodiments, the secondary release section 149 may be located in two or more locations on the shingle 150. For example, the secondary release section 149 and the secondary release section 149 may run along the common bond area where the overlay sheet 160 and the underlay sheet 180 overlap as shown in FIG. 7 and the secondary release section 149 may also run along the back side of the overlay sheet 160 adjacent to in close proximity (e.g., within 3 cm) to the underlay sheet 180. The secondary release section 149 may be applied directly to the second asphalt coating 162 or the backdust layer of particles 164. The secondary release section 149 may comprise a parting agent material and be free of a secondary release tape. While shown as a continuous strip, the secondary release section 149 may also be applied to form a design or a pattern.

Figure 9:
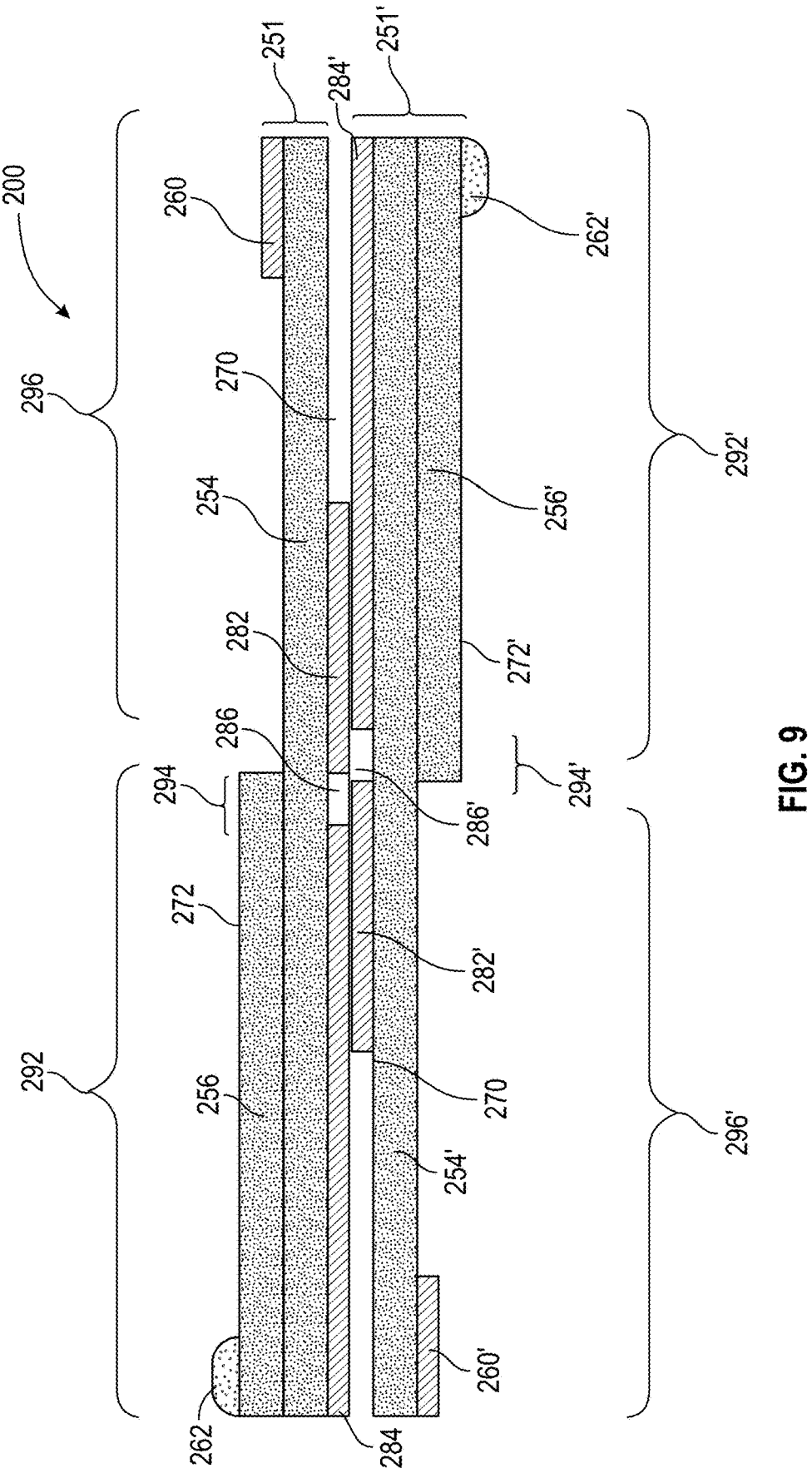
FIG. 9 is a side elevational view of stack of a single layer tabbed shingles.

As indicated above, the coated shingles exhibit reduced face-to-face sticking when stacked. FIG. 9 provides a side elevational view of stack of two single layer tabbed shingles 200. The stack of a laminated shingles 200 includes a first laminated shingle 251 that includes a first asphalt-coated substrate 254 laminated to a second asphalt-coated substrate 256. The first asphalt-coated substrate 254 and the second asphalt-coated substrate 256 form a tab section 292, a nail zone 294, and a headlap section 296. The first laminated shingle 251 includes a front side 270 and an opposing back side 272. The back side 272 of the first laminated shingle 251 includes a primary release section 260 (e.g., release tape or a parting material) and an adhesive 262. Optionally, the first laminated shingle 251 may include a secondary release tape (not shown). Located on the front side 270 of the first laminated shingle 251 is a first anti-stick coating 282 and a second anti-stick coating 284. While the first laminated shingle 251 is shown with both a first anti-stick coating 282 and a second anti-stick coating 284, embodiments also may include only first anti-stick coating 282 or only the second anti-stick coating 284. The first anti-stick coating 282 may extend to include section 286 and coat over the nail zone 294. Optionally, when section 286 includes an extension of the first anti-stick coating 282, the first anti-stick coating 282 may connect with the second anti-stick coating 284. In other embodiments, section 286 may include a reinforcement material, which may optionally be coated with the section 286 may include a reinforcement material.

Similarly, the stack of a laminated shingles 250 includes a second laminated shingle 251' that includes a first asphalt-coated substrate 254' laminated to a second asphalt-coated substrate 256'. The first asphalt-coated substrate 254' and the second asphalt-coated substrate 256' form a tab section 292', a nail zone 294', and a headlap section 296'. The second laminated shingle 251' includes a front side 270' and an opposing back side 272'. The back side 272' of the second laminated shingle 251' includes a primary release section 260' (e.g., release tape or a parting material) and an adhesive 262'. Optionally, the second laminated shingle 251' may include a secondary release tape (not shown). Located on the front side 270' of the second laminated shingle 251' is a first anti-stick coating 282' and a second anti-stick coating 284'. While the second laminated shingle 251' is shown with both a first anti-stick coating 282' and a second anti-stick coating 284', embodiments also may include only the first anti-stick coating 282' or only the second anti-stick coating 284'. The first anti-stick coating 282' may extend to include section 286' and coat over the nail zone 294'. Optionally, when section 286' includes an extension of the first anti-stick coating 282', the first anti-stick coating 282' may connect with the second anti-stick coating 284'. In other embodiments, section 286' may include a reinforcement material, which may optionally be coated with the section 286' may include a reinforcement material.

The stack of a laminated shingles 250 shows the first laminated shingle 251 and the second laminated shingle 251' in a front-to-front configuration, where the front side 270 of the tab section 292 of the first laminated shingle 251 opposes the front side 270' of the headlap section 296' of the second laminated shingle 251'. Accordingly, one or more of the anti-stick coatings (i.e., first anti-stick coating 282, a second anti-stick coating 284, first anti-stick coating 282' and a second anti-stick coating 284') prevent or reduce sticking between the first laminated shingle 251 and the second laminated shingle 251'. Multiple stacks of laminated shingles 200 may be stacked to form alternating front-to-front/back-to-back configuration.

Figure 10:
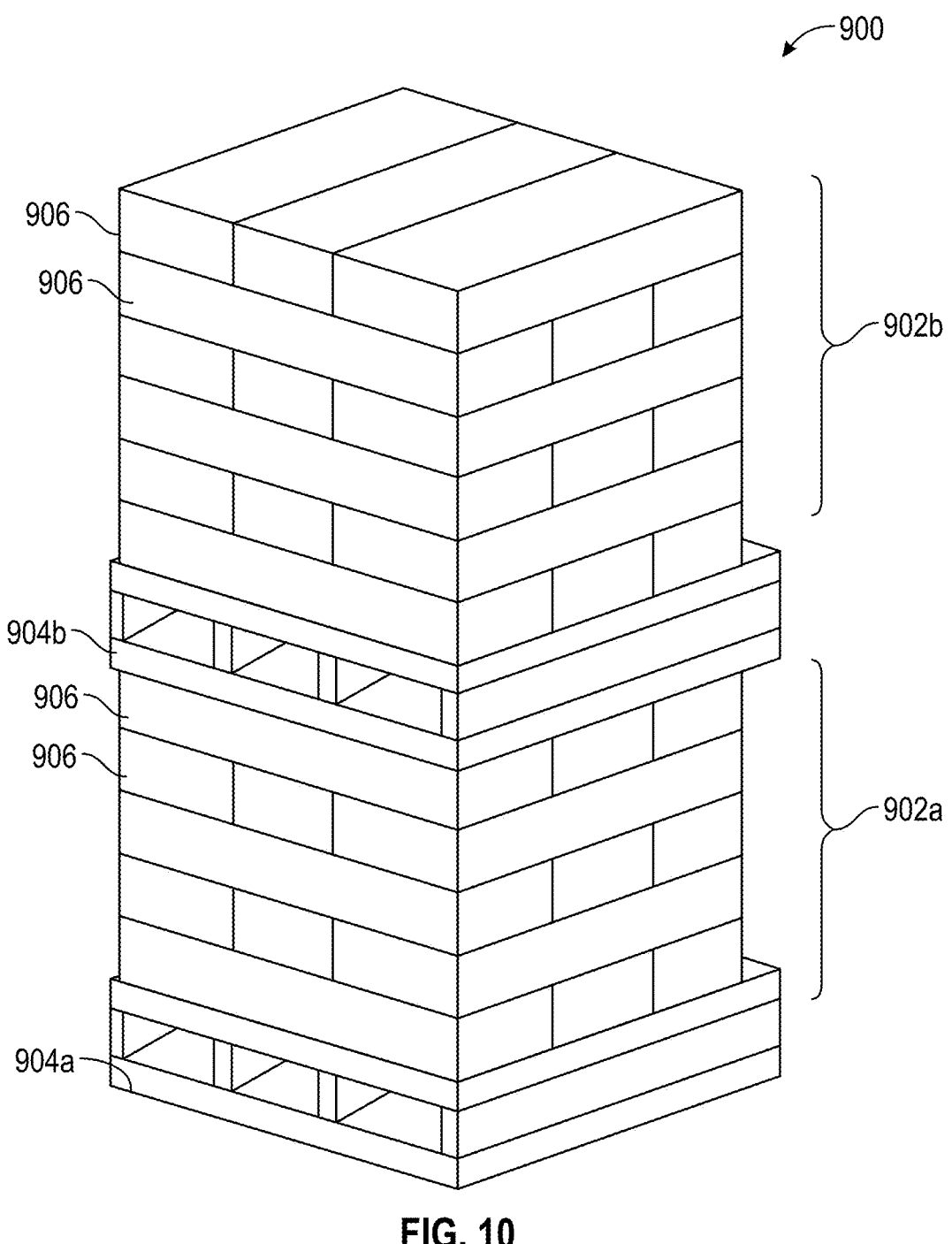
FIG. 10 is a schematic illustration of a first pallet of shingles and a second pallet of shingles, where the second pallet of shingles is stacked on top of the first pallet of shingles.

Advantageously, the coated shingles reduced sticking and may be "double stacked." With reference to FIG. 10, a double stack of shingles 900 is illustrated. The double stack of shingles 900 includes a first stack of shingles 902a stacked on top of a first pallet 904a. A second pallet 904b is stacked on the first stack of shingles 902a, and a second stack of shingles 902b is stacked on the second pallet 904b. Each of the first stack of shingles 902a and the second stack of shingles 902b is made of bundles of shingles 906. Each bundle of shingles 906 includes a packaged stack of shingles (not shown) that is stacked in either a front-to-back or an alternating front-to-front/back-to-back configuration. In any of the exemplary embodiments, release tape may be included between consecutively stacked shingles. Alternatively, a release section that includes a parting agent may be employed between consecutively stacked shingles. In other embodiments, however, due to the ability of the anti-stick coating to reduce sticking, the release tape may be omitted. In these or other embodiments, the shingles may be stacked without the use of release tape. The packages of shingles may be packaged in a wrapper, bag, box, or the like. The package may take a wide variety of forms, such as a plastic wrapper, a paper wrapper, a plastic bag, shrink wrap, a cardboard box, a polyethylene wrapper (e.g., 1.5-2.5 mil thick), or the like. While the first stack of shingles 902a and the second stack of shingles 902b are shown as bundles of shingles 906 the stacks of shingles may take other configurations, layouts, and packaging based upon the, size, shape, transportation, and storage needs of the shingles.

Suitable anti-stick coating materials for use on the face of the shingle include those materials that reduce face-to-face or front-to-back sticking in a stack of shingles compared to an otherwise comparable stack of shingles that do not include the anti-stick coating on at least one of the shingles. Suitable anti-stick coatings include metal salts of fatty acids, silanes, siloxanes, silicones, silicone rubbers, silica nanoparticles, polysilazanes (e.g., inorganic perhydro-polysilazanes and organic polysilazanes), waxes (e.g., carnauba wax, Fischer-Tropsch wax, polyethylene wax, paraffin wax), styrene-butadiene rubbers (SBR), esters of acrylic polymers (e.g., core-shell self-crosslinking acrylate polymers), maleated polypropylene, polyolefins, acrylic, acrylic copolymers, vinyl acetates, polyurethanes, acrylated urethanes, fluoropolymers (e.g., polytetrafluoroethylene, perfluoroalkoxy alkane, fluorinated ethylene propylene, ethylene tetrafluoroethylene, polyvinylidene fluoride, and ethylene chlorotrifluoroethylene), poly propyl methacrylate, poly propyl methacrylate with fluorosalts and combinations thereof.

In any of the exemplary embodiments, the anti-stick coating may be extended into the nail zone and provides anti-sticking properties when stacked without deleteriously impacting the ability of the shingle to bond to the adhesive of an adjacent shingle during installation. For instance, acrylic polymers, polyurethanes, and combinations thereof are particularly beneficial for their ability to maintain bond strength.

Additionally, as the anti-stick coating may be applied to a region of the shingle that is visible during final installation, the anti-stick coating should have good anti-sticking properties while not diminishing the appearance of the shingle. Particularly advantageous anti-stick coatings provide a clear coating on the surface of the shingle. Exemplary clear anti-stick coatings include acrylic polymers, polyurethanes, and combinations thereof.

As indicated above, in any of the exemplary embodiments disclosed or suggested herein, metal salts of fatty acids may be employed as the anti-stick coating. Metal salts of fatty acids, which may sometimes be referred to as metal soaps, include those compounds that have a saturated or unsaturated residue of a fatty acid and a metal ion. Each metal salt of a fatty acid may have one or more residues of a fatty acid per metal ion based upon the charge of the metal ion. In any of the exemplary embodiments, the metal salts of fatty acids may have linear carbon chain that includes from 12 to 22 carbon atoms, and in other embodiments from 14 to 18 carbons atoms. In any of the exemplary embodiments, the metal salt of the fatty acid may have a low solubility in water. In any of the exemplary embodiments, the metal salt of a fatty acid may be characterized by the solubility of the metal salt of a fatty acid in water at 15° C. In any of the exemplary embodiments, the metal salt of a fatty acid has a solubility of less than 0.010 g/100 mL at 15° C., less than 0.008 g/100 mL at 15° C., less than 0.006 g/100 mL at 15° C., less than 0.005 g/100 mL at 15° C., or less than 0.004 g/100 mL at 15° C. As the metal salt of a fatty acid has low solubility in water, it remains in particulate form in the emulsion and does not dissolve. The anti-stick composition that includes a metal salt of a fatty acid that has low solubility in water may also be referred to as a dispersion or a slurry. In these or other embodiments, the metal salt of a fatty acid may be characterized by a median particle size. In any of the exemplary embodiments, the median particle size of the metal salt of a fatty acid may be in the range of 4 microns to 7 microns and in other embodiments 5.5 microns to 6.5 microns.

In any of the exemplary embodiments, the metal salt of a fatty acid may include a saturated fatty acid. Suitable metal salts of saturated fatty acids include, but are not limited to, metal laurates, metal myristates, metal palmitates, and metal stearates. Exemplary metal laurates include, but are not limited to, zinc laurate, calcium laurate, aluminum laurate, and magnesium laurate. Exemplary metal myristates include, but are not limited to, zinc myristate, calcium myristate, aluminum myristate, and magnesium myristate. Exemplary metal palmitates include, but are not limited to, zinc palmitate, calcium palmitate, aluminum palmitate, and magnesium palmitate. Exemplary metal stearates include, but are not limited to, zinc stearate, calcium stearate, aluminum stearate, and magnesium stearate.

As indicated above, in any of the exemplary embodiments, acrylic polymers may be employed as the anti-stick coating. Exemplary acrylic polymers may be core-shell polymers. Core-shell acrylic polymers may include core-shell polymers that have acrylic cores, shells, or both the core and shell. Exemplary acrylic polymers may be self-crosslinking. In any of the exemplary embodiments, the self-crosslinking acrylic polymer may crosslink after the self-crosslinking acrylic polymer is applied to the shingle during curing process. For example, the self-crosslinking acrylic polymer may by applied in a carrier solvent, such as water, and crosslinking will occur as the water evaporates. Exemplary types of acrylic polymers include, but are not limited to, styrene acrylics, vinyl acrylics, polystyrene acrylics, polybutyl methacrylate, polystyrene methacrylate, and combinations thereof. In any of the exemplary embodiments, the acrylic polymer may be characterized by a glass transition temperature ("Tg"), which may be less than less than 60° C., less than 40° C., less than 30° C., or less than 20° C. In any of the exemplary embodiments, the acrylic polymer may be characterized by a Tg in the range of 10° C. to 60° C.

In any of the exemplary embodiments, the polyurethane may be characterized by a Tg, which may be less than less than 10° C., less than 0° C., less than −30° C., or less than −45° C. In any of the exemplary embodiments, the acrylic polymer may be characterized by a Tg" in the range of 10° C. to −70° C.

As indicated above, in any of the exemplary embodiments disclosed or suggested herein, silanes may be employed as the anti-stick coating and/or parting agent material. Silane compounds may be defined by the formula:

$$SiR_4$$

where each R is individually selected from a hydrogen atom and a monovalent organic group. In any of the exemplary embodiments, each R is individually a monovalent organic group. In any of the exemplary embodiments, the monovalent organic group may a linear, cyclic, or branched hydrocarbon group having from 1 to 20 carbon atoms. In any of the exemplary embodiments, the monovalent organic group may have 2 to 6 carbon atoms. Optionally, one or more of the hydrogen or carbon atoms in the hydrocarbon groups may be substituted with a heteroatom such as an oxygen atom, a silicon atom or a halogen atom. Exemplary monovalent organic groups include methyl, ethyl, epoxy, amine, acrylate, and phenyl groups. In any of the exemplary embodiments, the silane may be bifunctional or trifunctional. Exemplary silanes include methyltrimethoxysilane, gamma-aminopropyltriethoxysilane, and gamma-glycidoxypropylthrimethoxysilane.

In any of the exemplary embodiments, the silane may be a superhydrophobic silane. Superhydrophobic silanes provide a coating that produces a contact angle greater than 150 degrees. The contact angle may be determined by placing a droplet of water on the surface of the hydrophobic material. The contact angle of a droplet of water may be measured at room temperature (i.e., 23° C.) using a goniometer on a 6 microliter droplet of deionized (DI) water. The measurement should be determined after the droplet has come to rest on the hydrophobic surface (e.g., between 10 to 20 seconds after the droplet is applied to the surface). Multiple determinations of the contact angle should be averaged (e.g. 5 or 10 replicates) to obtain a final value.

In any of the exemplary embodiments, where one or more of the monovalent organic groups of the silane compound are alkoxy groups or siloxy groups, the silane compound may also be referred to as a siloxane. Siloxane compounds may be defined by the formula $$SiR_{4-n}(OR')_n$$

where each R is individually selected from a hydrogen atom and a monovalent organic group, each R' is a monovalent organic group, and n is an integer from 1 to 4. In any of the exemplary embodiments, n may be 2 or 3. In any of the exemplary embodiments, each R is individually a monovalent organic group. In any of the exemplary embodiments, the monovalent organic group may a linear, cyclic, or branched hydrocarbon group having from 1 to 20 carbon atoms. In any of the exemplary embodiments, the monovalent organic group may have 2 to 6 carbon atoms. In any of the exemplary embodiments, the monovalent organic group may be a siloxy group. In any of the exemplary embodiments, the monovalent organic group, R', may be a trialkylsilyl group. Optionally, one or more of the hydrogen or carbon atoms in the hydrocarbon groups may be substituted with a heteroatom such as an oxygen atom, a silicon atom, or a halogen atom. Exemplary monovalent organic groups include methyl, ethyl, and phenyl groups. Exemplary siloxanes include octamethyldisiloxane, hexamethyldisiloxane, and hexamethylcyclotetrasiloxane.

Suitable silicones include polysiloxane oligomers and polymers. The silicone may be linear, branched, or cyclic, or crosslinked in structure. In any of the exemplary embodiments, the silicone may be defined by the formula $$[R_2SiO]_n$$

where each R is individually a monovalent organic group and n is in the range of 5 to 10,000. In any of the exemplary embodiments, n may be from 10 to 5,000, in other embodiments n may be from 20 to 500. In any of the exemplary embodiments, the monovalent organic group may a linear, cyclic, or branched hydrocarbon group having from 1 to 20 carbon atoms. In any of the exemplary embodiments, the monovalent organic group may have 2 to 6 carbon atoms. Optionally, one or more of the hydrogen or carbon atoms in the hydrocarbon groups may be substituted with a heteroatom, such as a silicon atom or a halogen atom, or a polysiloxane chain. Exemplary monovalent organic groups include methyl, ethyl and phenyl groups. Exemplary silicones include polyether-modified siloxane, polyether-modified polysiloxane, polyether-modified polydimethylsiloxane, dimethyl silicone fluid, emulsions of silicone rubber, silicone oil, and polydimethylsiloxane.

As indicated above, polyolefins may be employed as the anti-stick coating. Exemplary polyolefins include, but are not limited to, polyethylene and polypropylene. Exemplary polyethylenes include high density polyethylene, medium density polyethylene, low density polyethylene, and linear low density polyethylene. In any of the exemplary embodiments, the polyolefin may be characterized by a glass transition temperature ("Tg"). In any of the exemplary embodiments, where the parting agent material is applied to a hot asphalt surface, the Tg of the polyolefin may be less than the surface temperature of the asphalt. In any of the exemplary embodiments, the Tg may be less than 230° C., in other embodiments less than 200° C., an in other embodiments less than 180° C. In any of the exemplary embodiments, the Tg may be in the range of 50° C. to 230° C., in other embodiments in the range of 60° C. to 200° C., in other embodiments in the range of 70° C. to 180° C., in other embodiments in the range of 80° C. to 160° C., and in other embodiments in the range of 90° C. to 150° C.

In any of the exemplary embodiments, the anti-stick coating may include one or more additives. Suitable additives for inclusion in the anti-stick coating includes emulsifiers, crosslinkers, wetting agents, antimicrobial additives, metal biocides, matting agents, blocking agents (to prevent sticking), pigments to control aesthetics, photocatalytic materials, amphoteric surfactants, nonionic surfactants, and combinations thereof. In any of the exemplary embodiments, the anti-stick coating may be applied with a carrier solvent. Suitable carrier solvents include, but are not limited to, water and organic solvents. The anti-stick coating (and any optional additives) may be dispersed in the carrier solvent to form a coating composition. The anti-stick coating composition may be applied to the shingle using a variety of application methods. For example, the anti-stick coating composition may be applied to the shingle by spraying, roll coating, transfer roll coating, flood coating, a hot melt spray, reverse roll coating, or another suitable application method. The anti-stick coating composition may be applied to the shingle during the manufacturing process while the asphalt is still hot from coating the substrate or after the asphalt coating cools to ambient temperate (e.g., 18° C. to 30° C.). When an anti-stick coating composition is applied to the shingle during the manufacturing process, a layer of the anti-stick coating is formed on the shingle. For example, when an anti-stick coating composition is applied to the hot asphalt coating of the shingle, the carrier solvent (e.g., water) in the liquid-applied coating composition flashes off or otherwise vaporizes, leaving a residual layer of coating on the granules and exposed asphalt coating of the shingle.

In any of the exemplary embodiments, the anti-stick coating composition may be characterized by a viscosity that may be measured by viscometer at 25° C. In any of the exemplary embodiments, the anti-stick coating composition may have a viscosity of less than 15,000 cps, less than 12,000 cps, less than 10,000 cps, less than 8,000 cps, less than 7,000 cps, less than 5,000 cps, or less than 3,000 cps. In any of the exemplary embodiments, the anti-stick coating composition may have a viscosity of greater than 1 cps, greater than 5 cps, greater than 50 cps, greater than 75 cps, greater than 100 cps, greater than 150 cps, or greater than 200 cps. In any of the exemplary embodiments, the anti-stick coating composition may have a viscosity of in the range of 15,000 cps to 1 cps, 12,000 cps to 5 cps, 10,000 cps to 50 cps, 8,000 cps to 100 cps, 10,000 cps to 150 cps, 8,000 cps to 200 cps, or 7,000 cps to 50 cps. However, those skilled in the art will appreciate that viscosities of various coating types may have wide variances and the appropriate viscosity range for different methods of applying a coating may vary. Accordingly, in any of the exemplary embodiments, the viscosity may be at least 100,000 cps, at least 500,000 cps, or at least 1,000,000 cps.

In any of the exemplary embodiments, the anti-stick coating composition may be characterized by a surface energy, which may be determined by a sessile drop measurement with an optical tensiometer, for example. The surface energy may comprise the sum of the polar and dispersive components. In any of the exemplary embodiments, the anti-stick coating composition may have a surface energy that is in the range of 10 mN/m to 70 mN/m, 20 mN/m to 65 mN/m, 25 mN/m to 60 mN/m, 30 mN/m to 50 mN/m, 32 mN/m to 48 mN/m, or 35 mN/m to 46 mN/m. In any of the exemplary embodiments, the anti-stick coating composition may have a dispersive component of the surface energy that is in the range of 28 mN/m to 45 mN/m, 30 mN/m to 42 mN/m, or 31 mN/m to 40 mN/m. In any of the exemplary embodiments, the anti-stick coating composition may have a polar component of the surface energy that is in the range of 0 mN/m to 50 mN/m, 1 mN/m to 20 mN/m, 3 mN/m to 10 mN/m, or 4 mN/m to 9 mN/m.

In any of the exemplary embodiments, the percent difference in surface energy between the anti-stick coating composition and the granules may be less than 35%, less than 30%, less than 25%, less than 20%, less than 15%, or less than 10%. In any of the exemplary embodiments, the percent difference in surface energy between the anti-stick coating composition and the asphalt coating may be less than 30%, less than 25%, less than 20%, less than 15%, less than 10%, or less than 5%.

The anti-stick coating may be described by the mass of the coating applied per square meter on a dry basis. In any of the exemplary embodiments, the amount of anti-stick coating may be greater than 0.0005 kg/m², in other embodiments greater than 0.001 kg/m², in other embodiments greater than 0.005 kg/m², in other embodiments greater than 0.01 kg/m², in other embodiments greater than 0.03 kg/m², in other embodiments greater than 0.04 kg/m², and in other embodiments greater than 0.05 kg/m². In any of the exemplary embodiments, the amount of the anti-stick coating may be less than 1 kg/m², in other embodiments less than 0.5 kg/m², in other embodiments less than 0.3 kg/m², in other embodiments less than 0.2 kg/m², in other embodiments less than 0.15 kg/m², in other embodiments less than 0.1 kg/m², and in other embodiments less than 0.08 kg/m². In any of the exemplary embodiments, the amount of the anti-stick coating may be in the range of 0.0005 kg/m² to 1 kg/m², in other embodiments from 0.001 kg/m² to 0.5 kg/m², in other embodiments from 0.005 kg/m² to 0.3 kg/m², in other embodiments from 0.01 kg/m² to 0.2 kg/m², in other embodiments from 0.03 kg/m² to 0.15 kg/m², in other embodiments from 0.04 kg/m² to 0.1 kg/m², and in other embodiments from 0.05 kg/m² to 0.08 kg/m².

The substrate of the coated shingle can be any type known for use in reinforcing asphalt-based roofing materials, such as a web, scrim or felt of fibrous materials such as mineral fibers, glass fibers, cellulose fibers, rag fibers, mixtures of glass and synthetic fibers, or the like. Combinations of materials can also be used in the substrate. In any of the exemplary embodiments, the substrate is a nonwoven web of glass fibers. The substrate may be any substrate used in asphalt shingles, roll roofing, low-slope membranes, and the like.

The asphalt coating, which may also be referred to as the asphalt coating composition, is generally formed from a layer of hot, melted asphalt applied to the substrate. The asphalt coating can be applied to the substrate in any suitable manner. For example, the substrate can be submerged in the asphalt or the asphalt can be rolled on, sprayed on, or applied to the substrate by other means. The asphalt coating may include any type of bituminous material suitable for use on a roofing material, such as asphalts, tars, pitches, or mixtures thereof. Suitable asphalts for use in the asphalt coating composition include manufactured asphalts produced by refining petroleum or naturally occurring asphalts. The asphalt coating composition may include various types or grades of asphalt, including flux, paving grade asphalt blends, propane washed asphalt, oxidized asphalts, non-oxidized asphalts, partially oxidized asphalts, and/or blends thereof. The asphalt coating composition may include one or more additives including, but not limited to, polymers, waxes, inorganic fillers, mineral stabilizers, recycled asphalt streams, and oils.

As indicated above, the asphalt coating composition may include a polymer. Asphalt compositions that include polymers may be referred to as polymer-modified asphalt compositions. Suitable polymers include, but are not limited to, styrene-butadiene-styrene (SBS), styrene-butadiene rubber (SBR), styrene-isoprene-styrene (SIS), thermoplastic polyolefin (TPO), atactic polypropylene (APP), ground tire rubber, styrenic block copolymers, styrene-ethylene-butylene-styrene (SEBS), and combinations thereof. In any of the exemplary embodiments, the asphalt coating composition may include from about 1 wt. % to about 25 wt. %, in other embodiments from about 2 wt. % to about 15 wt. %, and in other embodiments from about 3 wt. % to about 10 wt. % polymer, based upon the total weight of the asphalt coating composition.

In any of the exemplary embodiments, the asphalt coating composition (with the inclusion of any optional additives) may be characterized by a penetration value in penetration units, which is often referred to colloquially as a pen or pen value. The penetration value may be determined using the procedure detailed in ASTM D D5M-20, which is incorporated herein by reference. In any of the exemplary embodiments, where the penetration value is determined a temperature of 25° C. (77° F.) with a 100 gram weight, the penetration value may be greater than 12 penetration units, in other embodiments greater than 15 penetration units, in other embodiments greater than 18 penetration units, and in other embodiments greater than 20 penetration units. In any of the exemplary embodiments, where the penetration value is determined a temperature of 25° C. (77° F.) with a 100 gram weight, the penetration value may be less than 75 penetration units, in other embodiments less than 50 penetration units, in other embodiments less than 45 penetration units, and in other embodiments less than 40 penetration units. In any of the exemplary embodiments, where the penetration value is determined a temperature of 25° C. (77° F.) with a 100 gram weight, the penetration value may be from about 12 penetration units to about 75 penetration units, in other embodiments from about 15 penetration units to about 50 penetration units, in other embodiments from about 18 penetration units to about 45 penetration units, and in other embodiments from about 20 penetration units to about 40 penetration units.

The granules are generally deposited onto the asphalt coating after the asphalt coating is applied to the substrate. The shingles may be passed through rollers to further embed the granules into the asphalt coating. The granules may comprise a variety of different materials. The granules may be ceramic roofing grade granules that are made in any known or conventional manner. Any type of roofing granule may be used. The granules may comprise a variety of different particle sizes and colors. Further, a variety of different granules may be blended together, for example to provide different color blends or to provide the appearance of varying thickness to the shingle.

The layer of backdust particles may be deposited onto the asphalt coating after the asphalt coating is applied to the substrate. The shingles may be passed through rollers to further embed the backdust particles into the asphalt coating. As mentioned above, the backdust material is typically a particulate material. Exemplary materials for use as backdust include, but are not limited to, sand, talc, mica, calcium carbonate, ground recycled glass, quartz, feldspar, dolomite, coal slag, and other common inorganic materials. The backdust may comprise a variety of different particle sizes. For example, the backdust particles may have an average particle size in the range of 20 μm to 1,000 μm, 60 μm to 600 μm, 100 μm to 400 μm, or 100 μm to 300 μm.

One or more portions of the coated shingle may optionally comprise a reinforcement layer (e.g., reinforcement layer 151 as illustrated in FIG. 5). The reinforcement layer may be a strip that is located longitudinally in the nail zone of the coated shingle. In any of the exemplary embodiments, the reinforcement layer may be attached to the asphalt coating, such as by the adhesive mixture of the asphalt coating or other adhesives. In any of the exemplary embodiments, the reinforcement layer may be a polymeric layer formed from, for example, a polyester, polyolefin (e.g., polypropylene, polyethylene), or the like. However, the reinforcement layer may be formed from other materials, such as, for example, paper, film, scrim material, and woven or non-woven glass.

For example, in any of the exemplary embodiments, the coated shingle may include a reinforcement layer comprising strip of woven polyester material applied to the surface of the shingle after application of the asphalt coating, such that the asphalt material penetrates the strip between the woven fibers of the polyester fabric, to embed the strip of material in the base asphaltic layer and secure the strip to the shingle. The polyester strip may be applied prior to the granule coating of the shingle, and the granules may not adhere to the strip-covered portion of the shingle. The strip of polyester material may, for example, define a shingle nail zone and provide reinforcement for the nailed portion of the shingle. In any of the exemplary embodiments, the reinforcement layer may have a width in the range of 0.5 cm to 8 cm, 1.5 cm to 7 cm, or 2 cm to 5 cm.

As shown in FIGS. 3 and 7, the single layer tabbed shingle 100 includes an adhesive 130 and laminated shingle 150 includes an adhesive 166. The adhesives 130 and 166 may each be any type of adhesive suitable for use in roofing materials. For example, the adhesive 130 or 166 may be a heat sensitive adhesive including, but not limited to, a filled asphalt adhesive and a polymer modified asphalt adhesive. The adhesive 130 adheres the tab portions 105 of an upper course of shingles on a roof to the headlap portions 103 of a lower course of shingles on the roof. Similarly, the adhesive 166 adheres the tab portions 167 of an upper course of shingles on a roof to the headlap portions 161 of a lower course of shingles on the roof. The resulting adhesive bond helps prevent wind uplift of the shingles on the roof. While the adhesives 130 and 116 are each shown as a strips, each of the adhesives 130 and 166 is not so limited and instead may be applied in various forms and configurations including, but not limited to, dots, lines, discontinuous segments, or combinations thereof.

As indicated above, the coated shingle may include a release section. The release section may be a release tape or a parting material. In certain embodiments, where the coated shingle includes two or more release sections, each release section may be a release tape or a parting material. For example, if the coated shingle has two release sections, the primary release section may be a release tape or a parting material and the secondary release section may be a release tape or a parting material.

Suitable materials for use in the parting agent material include materials that helps to prevent the sticking of two consecutively stacked shingles. In any of the exemplary embodiments, the parting agent may be oleophobic. Suitable parting agents include metal salts of fatty acids, silanes, siloxanes, silicones, silicone rubbers, silica nanoparticles, polysilazanes (e.g., inorganic perhydro-polysilazanes and organic polysilazanes), waxes (e.g., carnauba wax), styrene-butadiene rubbers (SBR), esters of acrylic polymers, maleated polypropylene, polyolefins, acrylic, acrylic copolymers, vinyl acetates, polyurethanes, acrylated urethanes, fluoropolymers (e.g., polytetrafluoroethylene, perfluoro-alkoxy alkane, fluorinated ethylene propylene, ethylene tetrafluoroethylene, polyvinylidene fluoride, and ethylene chlorotrifluoroethylene), poly propyl methacrylate, poly propyl methacrylate with fluorosalts and combinations thereof.

In any of the exemplary embodiments, the parting agent material consists of the parting agent or a mixture of parting agents. In any of the exemplary embodiments, the parting agent material may include optional components such as emulsifiers, crosslinkers, wetting agents, antimicrobial additives, metal biocides, matting agents, blocking agents (to prevent sticking), pigments to control aesthetics, photocatalytic materials, amphoteric surfactants, nonionic surfactants, and combinations thereof. In other embodiments, the parting material consists essentially of the parting agent or a mixture of parting agents. In these embodiments, the parting material may include a small amount (e.g., less than 5%) of components or additives that may be include for aesthetic, filling, or provide only a small or no change in the anti-sticking properties of the parting material.

Examples of suitable wetting agents include calcium hydroxide, non-ionic silicones, salts of fatty acids, alkyl-benzene sulfonates, alkyl sulfates, alkyl ether sulfates, ethoxylates, amphoteric surfactants, nonionic surfactants, and combinations thereof.

In any of the exemplary embodiments, the parting agent material may be applied with a carrier solvent. Suitable carrier solvents include, but are not limited to, water and organic solvents. The parting agent material (and any optional components) may be dispersed in the carrier solvent to form a parting agent composition. The parting agent composition may be applied to the shingle using a variety of application methods. For example, the parting agent composition may be applied to the shingle by spraying, roll coating, transfer roll coating, flood coating, reverse roll coating, or another suitable application method. When the parting agent composition is applied to the shingle during the manufacturing process, a layer of the parting material is formed on the shingle. For example, when a parting agent composition is applied to the hot asphalt coating of the shingle, the carrier solvent (e.g., water) in the liquid-applied parting agent flashes off or otherwise vaporizes, leaving a residual layer of parting material on the asphalt coating of the shingle.

In any of the exemplary embodiments, where the parting agent composition includes an emulsifier the parting agent composition may be characterized by the weight of emulsifier per volume of carrier solvent as a percentage. In any of the exemplary embodiments, the parting agent composition may include the emulsifier in an amount in the range of 0.1%-20%, in other embodiments in the range of 1% to 5%, in other embodiments in the range of 1.5% to 4%, and in other embodiments in the range of 2% to 3% based upon the total weight of the parting agent composition.

In any of the exemplary embodiments, where the parting agent composition includes a wetting agent the parting agent composition may be characterized by the weight of wetting agent per volume of carrier solvent as a percentage. In any of the exemplary embodiments, the parting agent composition may include the wetting agent in an amount in the range of 0.005% to 10%, in other embodiments in the range of 0.01% to 5%, in other embodiments in the range of 0.1% to 0.8%, and in other embodiments in the range of 0.2% to 0.6% based upon the total weight of the parting agent composition.

As indicated above, metal salts of fatty acids may be employed as the parting agent material. Suitable metal salts of fatty acids for use in the parting agent are described above. Similarly, suitable silanes, siloxanes, silicones, and polyolefins are also described above.

The parting agent material may be described by the mass of the parting agent material applied per square meter on a dry basis. In any of the exemplary embodiments, the amount of parting agent material may be greater than $0.0005 \text{ kg/m}^2$ to $1 \text{ kg/m}^2$, in other embodiments greater than $0.001 \text{ kg/m}^2$, in other embodiments greater than $0.005 \text{ kg/m}^2$, in other embodiments greater than $0.006 \text{ kg/m}^2$, in other embodiments greater than $0.007 \text{ kg/m}^2$, in other embodiments greater than $0.008 \text{ kg/m}^2$, and in other embodiments greater than $0.009 \text{ kg/m}^2$. In any of the exemplary embodiments, the amount of parting agent material may be less than $1 \text{ kg/m}^2$, in other embodiments less than $0.5 \text{ kg/m}^2$, in other embodiments less than $0.022 \text{ kg/m}^2$, in other embodiments less than $0.016 \text{ kg/m}^2$, in other embodiments less than $0.014 \text{ kg/m}^2$, in other embodiments less than $0.012 \text{ kg/m}^2$, and in other embodiments less than $0.011 \text{ kg/m}^2$. In any of the exemplary embodiments, the amount of parting agent material may be in the range of $0.0005 \text{ kg/m}^2$ to $1 \text{ kg/m}^2$, in other embodiments from $0.001 \text{ kg/m}^2$ to $0.5 \text{ kg/m}^2$, in other embodiments from $0.005 \text{ kg/m}^2$ to $0.022 \text{ kg/m}^2$, in other embodiments from $0.006 \text{ kg/m}^2$ to $0.016 \text{ kg/m}^2$, in other embodiments from $0.007 \text{ kg/m}^2$ to $0.014 \text{ kg/m}^2$, in other embodiments from $0.008 \text{ kg/m}^2$ to $0.012 \text{ kg/m}^2$, and in other embodiments from $0.009 \text{ kg/m}^2$ to $0.011 \text{ kg/m}^2$.

In any of the exemplary embodiments, the parting agent material may include two or more layers. In these or other embodiments, the parting agent material may include a polymeric support layer disposed on the backdust layer or the asphalt layer of the shingle and layer of parting material disposed on the polymeric support layer. In embodiments that include two or more release sections, parting agent materials that include a polymeric support layer and a parting material layer may be used in conjunction with a layer of parting agent material (i.e., without a polymeric support layer) and/or a release tape. For example, a shingle may include a primary release section that includes polymeric support layer and a layer of parting material and a secondary release section that includes a layer of parting material (i.e., without a polymeric support layer).

Suitable polymeric support layers may include acrylics, acrylated urethanes, poly(p-xylylene) polymers (which may also be referred to as parylenes), and combinations thereof.

In any of the exemplary embodiments, the parting agent composition may be characterized by the weight of parting agent per volume of carrier solvent as a percentage. In any of the exemplary embodiments, the parting agent composition may include the parting agent material in an amount greater than 1%, in other embodiments greater than 2%, in other embodiments greater than 5%, in other embodiments greater than 6%, in other embodiments greater than 7%, and in other embodiments greater than 8% based upon the total weight of the parting agent composition. In any of the exemplary embodiments, the parting agent composition may include the parting agent material in an amount less than 99%, in other embodiments less than 50%, in other embodiments less than 20%, in other embodiments less than 15%, in other embodiments less than 12%, and in other embodiments less than 10% based upon the total weight of the parting agent composition. In any of the exemplary embodiments, the parting agent composition may include the parting agent material in an amount in the range of 1% to 99%, in other embodiments in the range of 2% to 50%, in other embodiments in the range of 5% to 20%, in other embodiments in the range of 6% to 15%, in other embodiments in the range of 7% to 12%, and in other embodiments in the range of 8% to 10% based upon the total weight of the parting agent composition.

As indicated above, the parting agent material may include optional components such as emulsifiers, crosslinkers, wetting agents, antimicrobial additives, metal biocides, matting agents, blocking agents (to prevent sticking), pigments to control aesthetics, photocatalytic materials, amphoteric surfactants, nonionic surfactants, and combinations thereof. The emulsifiers, crosslinkers, wetting agents, antimicrobial additives, metal biocides, matting agents, blocking agents (to prevent sticking), pigments to control aesthetics, photocatalytic materials, amphoteric surfactants, nonionic surfactants, and combinations thereof may be included in the parting agent composition.

As indicated above, the anti-stick coating on the coated shingle may reduce shingle to shingle sticking. A lap shear test may be performed to determine the force required to separate the two shingles stacked in a front-to-front orientation. A sample for the lap shear test may be prepared by placing the back side of a first 6 inch long and $1^{7/8}$ inch wide specimen of shingle against the back side of a second 6 inch long and $1^{7/8}$ inch wide specimen of shingle so that they have an overlap region of 2 inches. The first specimen includes the parting agent material in the overlapped region while the second material only includes a layer of backdust. A weight of 30 lbs. is applied to the top of the two shingle samples stacked in a front-to-front orientation for 24 hours at 65° C. The two-shingle specimen are then separated on a tensile tester, such as an Instron tensile tester, with crosshead speed of 2 inches per minute with a gauge length of 7 inches to calculate the maximum breaking force required to separate the two specimens. The above description may be hereinafter referred to as "the Lap Shear Test."

In any of the exemplary embodiments, the force required to separate two coated shingles determined via the above described lap shear test may be less than 80 lbs. of force, in other embodiments less than 50 lbs. of force, in other embodiments less than 40 lbs. of force, in other embodiments less than 20 lbs. of force, in other embodiments less than 15 lbs. of force, in other embodiments less than 5 lbs. of force, in other embodiments less than 3 lbs. of force, and in other embodiments less than 1 lbs. of force. In any of the exemplary embodiments, the force required to separate the two coated shingles determined via a lap shear test may be in the range of 0 lbs. of force to 80 lbs. of force, in other embodiments in the range of 0.01 lbs. of force to 50 lbs. of force, in other embodiments in the range of 0.1 lbs. of force to 40 lbs. of force, in other embodiments in the range of 0.15 lbs. of force to 20 lbs. of force, in other embodiments in the range of 0.2 lbs. of force to 15 lbs. of force, in other embodiments in the range of 0.3 lbs. of force to 5 lbs. of force, in other embodiments in the range of 0.4 lbs. of force to 3 lbs. of force, and in other embodiments in the range of 0.5 lbs. of force to 1 lbs. of force.

Upon installation, the nail zone of a first coated shingle may be used as the bonding substrate area or bonding surface for an adhesive located on a second coated shingle. Bond strength between two shingles may be determined per a modified ASTM D6381M-15(2020). Per the modified testing, five test samples are pulled using a pull rate of 12 inches per minute. A sample may be prepared by cutting a 3.75 inches×7 inches coupon aligned from the bottom edge of the shingle, such that the bottom of the coupon is centered around the sealant bead, and a 3.75 inches×9 inches coupon aligned from the top edge of the shingle. The smaller coupon is placed on the face of the larger coupon, such that the sealant is aligned with the paint indicating the nail line or reinforcement strip. The coupon is placed in an oven at 140° F.+/−2° F. for 5 hours in order to allow the sealant to adhere to the substrate, and then allowed to rest at 73° F. for at least one hour to condition to room temperature. The coupon is then placed into a bond fixture such that both ends of the bottom coupons are fixed with clamps, and the Instron clamp is attached to the sealant end of the top coupon. The clamp is pulled at a speed of 12 inches per minute until the adhesive fails, and the peak force is noted.

In any of the exemplary embodiments, the use of the anti-stick coating does not negatively impact the bond strength between two bonded shingles via the above-described bond test. In some exemplary embodiments, the bond strength between two coated and bonded shingles may be greater than 3 lbs. of force, in other embodiments greater than 5 lbs. of force, in other embodiments greater than 8 lbs. of force, in other embodiments greater than 10 lbs. of force, in other embodiments greater than 12 lbs. of force, and in other embodiments greater than 20 lbs. of force. In any of the exemplary embodiments, the force required to separate bonded coated shingles may be in the range of 3 lbs. of force to 50 lbs. of force, in other embodiments in the range of 5 lbs. of force to 45 lbs. of force, in other embodiments in the range of 8 lbs. of force to 40 lbs. of force, in other embodiments in the range of 10 lbs. of force to 38 lbs. of force, in other embodiments in the range of 12 lbs. of force to 35 lbs. of force, and in other embodiments in the range of 20 lbs. of force to 30 lbs. of force.

Figure 15:
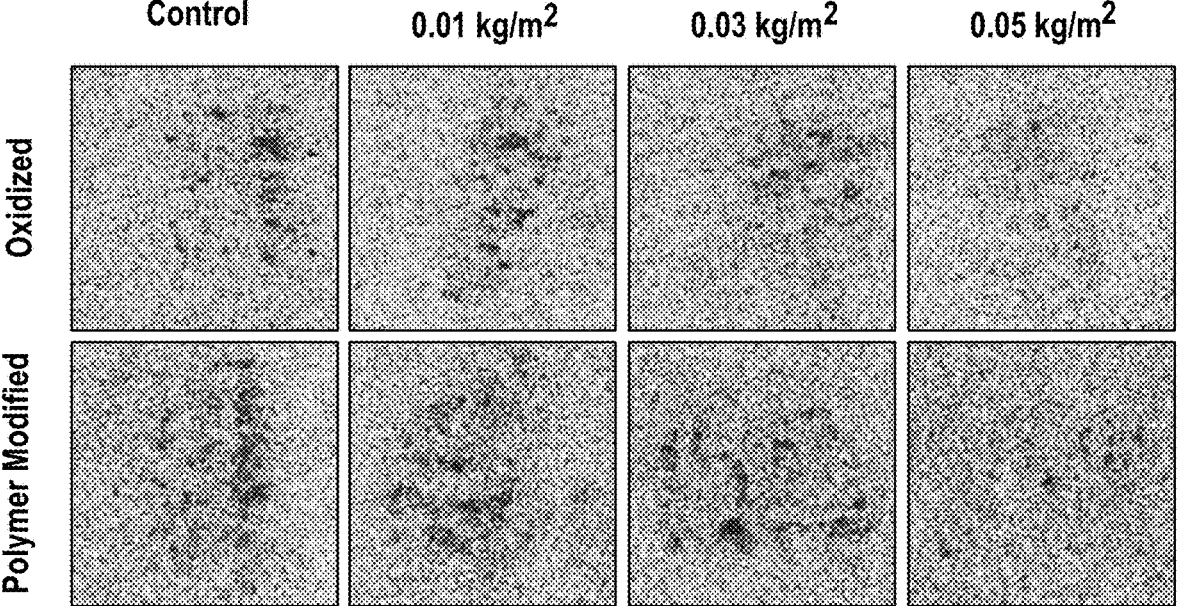
FIG. 15 shows the results of scuff testing on coated and uncoated shingles with oxidized asphalt and polymer modified-asphalt.

In any of the exemplary embodiments, the anti-stick coating may prevent or reduce the visual appears of scuffing on the granules of a shingle. Scuffing may be determined visually and compared to an uncoated shingle. Scuffing may be tested by attaching a section of shingle to a wood panel and placing the shingle in an oven heated to 170° F. for at least 4 hours to condition the single. After the shingle is conditioned, the shingle attached to the wooden board is secured to a pitched ramp. The shingle is quickly walked up in triplicate while the shingle is still hot. FIG. 15 illustrates the results of scuff testing on coated and uncoated (the Control) shingles with oxidized asphalt and SBS-polymer modified-asphalt. In FIG. 15, various amounts of an acrylic polymer-based anti-stick coating, are applied to both the oxidized asphalt and polymer modified-asphalt shingles. As can be seen in FIG. 15, the coated shingles have less scuff than the Control, and the visual scuffing lessens as the amount of anti-stick coating is increased.

Figure 11:
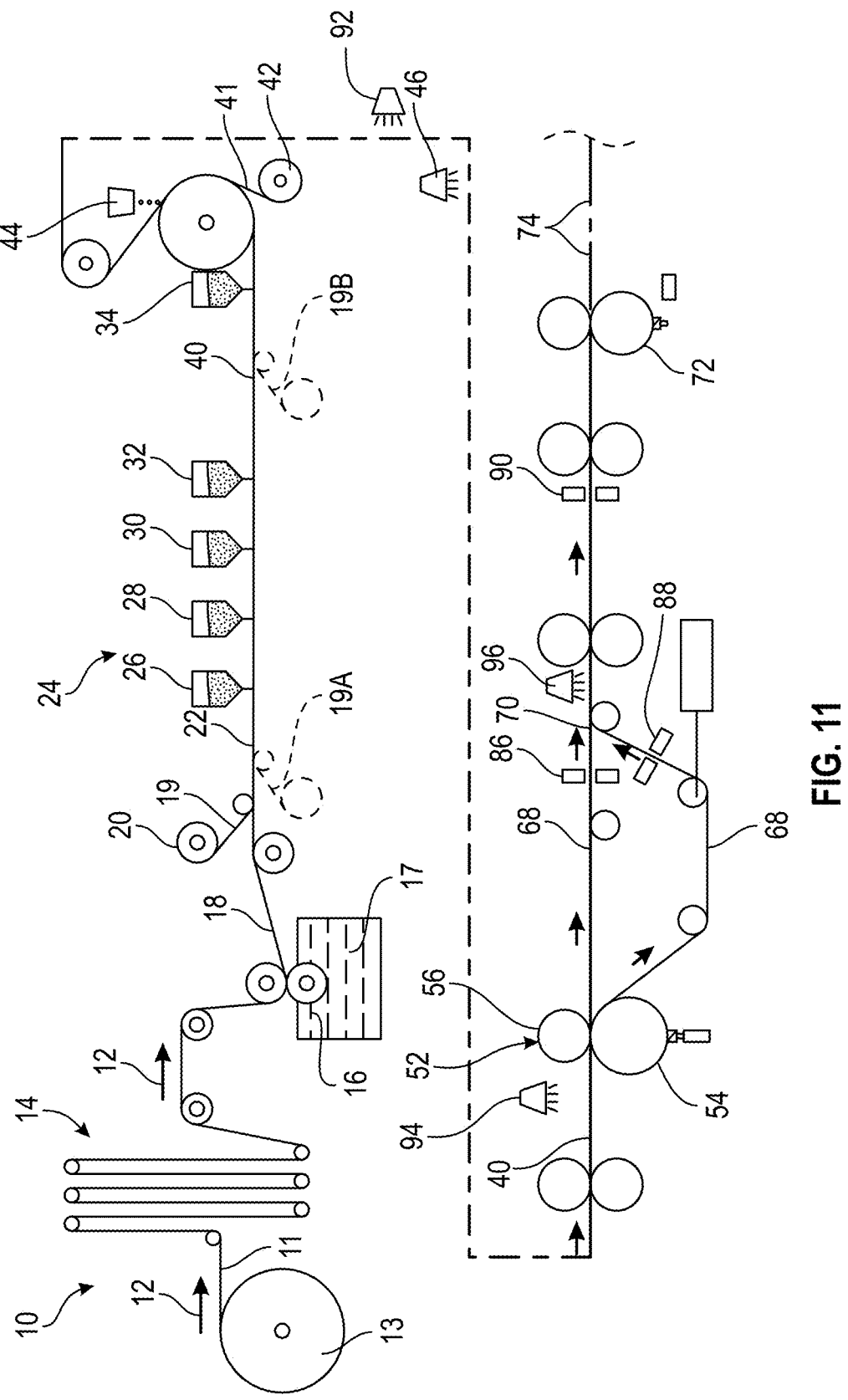
FIG. 11 is a schematic view in elevation of an exemplary embodiment of an apparatus for manufacturing an asphalt-based roofing material of the present disclosure.

FIG. 11 illustrates an exemplary apparatus 10 for manufacturing a coated shingle in accordance with the present exemplary embodiments. The manufacturing process involves passing a continuous sheet of substrate or shingle mat 11 in a machine direction 12 through a series of manufacturing operations. The mat 11 usually moves at a speed of at least about 200 feet/minute (61 meters/minute), and typically at a speed within the range of between about 450 feet/minute (137 meters/minute) and about 1200 feet/minute (366 meters/minute). The sheet, however, may move at any desired speed.

In a first step of the manufacturing process, the continuous sheet of shingle mat 11 is payed out from a roll 13. The shingle mat 11 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 11 is passed from the roll 13 through an accumulator 14. The accumulator 14 allows time for splicing one roll 13 of substrate to another, during which time the shingle mat 11 within the accumulator 14 is fed to the manufacturing process so that the splicing does not interrupt manufacturing.

Next, the shingle mat 11 is passed through a coater 16 where a coating of asphalt 17 is applied to the shingle mat 11 to form a first asphalt-coated sheet 18. The asphalt coating 17 may be applied in any suitable manner. In the illustrated embodiment, the shingle mat 11 contacts a supply of hot, melted asphalt 17 to completely cover the shingle mat 11 with a tacky coating of asphalt 17. However, in other embodiments, the asphalt coating 17 could be sprayed on, rolled on, or applied to the shingle mat 11 by other means. Typically, the asphalt coating is highly filled with a ground mineral filler material, amounting 30% to 80% by weight of the asphalt/filler combination. In one embodiment, the asphalt coating 17 is in a range from about 350° F. to about 400° F. In another embodiment, the asphalt coating 17 may be more than 400° F. or less than 350° F. The shingle mat 11 exits the coater 16 as a first asphalt-coated sheet 18. The asphalt coating 17 on the first asphalt-coated sheet 18 remains hot.

A continuous strip of a reinforcement material 19, as will be described in detail herein, may then be payed out from a roll 20. The reinforcement material 19 adheres to the first asphalt-coated sheet 18 to define a second asphalt-coated sheet 22. In a first embodiment, the reinforcement material 19 is attached to the sheet 18 by the adhesive mixture of the asphalt in the first asphalt-coated sheet 18. The reinforcement material 19, however, may be attached to the sheet 18 by any suitable means, such as other adhesives. As described above, the reinforcement material 19 may be a polymeric layer formed from, for example, a polyester, polyolefin (e.g., polypropylene, polyethylene), or the like. However, the reinforcement material 19 may also be formed from other materials, such as, for example, paper, film, scrim material, and woven or non-woven glass.

The resulting second asphalt coated sheet 22 may then be passed beneath a series of granule dispensers 24 for the application of granules to the upper surface of the second asphalt-coated sheet 22. The granule dispensers may be of any type suitable for depositing granules onto the asphalt-coated sheet. A granule dispenser that may be used is a granule valve of the type disclosed in U.S. Pat. No. 6,610, 147 to Aschenbeck. The initial granule blender 26 may deposit partial blend drops of background granules of a first color blend on the tab portion of the second asphalt coated sheet 22 in a pattern that sets or establishes the trailing edge of subsequent blend drops of a second color blend (of an accent color) and a third color blend (of a different accent color). For purposes of this disclosure, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult.

As is well known in the art, blend drops applied to the asphalt-coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. In addition, blend drops of darker and lighter shades of the same color, such as, for example, dark gray and light gray, are referred to as different color blends rather than merely different shades of one color.

As shown in FIG. 11, the series of dispensers 24 includes four color-blend blenders 26, 28, 30, and 32. Any desired number of blenders, however, may be used. The final blender may be the background blender 34. Each of the blenders may be supplied with granules from sources of granules, not shown. After the blend drops are deposited on the second asphalt-coated sheet 22, the remaining, uncovered areas are still tacky with warm, uncovered asphalt, and the background granules from the background blender 34 will adhere to the areas that are not already covered with blend drop granules. After all the granules are deposited on the second asphalt-coated sheet 22 by the series of dispensers 24, the sheet 22 becomes a granule-covered sheet 40.

In the illustrated embodiment, the reinforcement material 19 includes an upper surface to which granules substantially will not adhere. Granules may therefore be deposited onto substantially the entire second asphalt-coated sheet 22, including the material 19, but wherein the reinforcement material 19 includes an upper surface to which granules substantially will not adhere.

The granule-covered sheet 40 may then be turned around a slate drum to press the granules into the asphalt coating and to temporarily invert the sheet so that the excess granules will fall off and will be recovered and reused. Typically, the granules applied by the background blender 34 are made up by collecting the backfall granules falling from the slate drum.

In any of the exemplary embodiments, the primary release section may be a release tape. If desired, release tape 41 may be applied to the back side of the granule-covered sheet 40. For example, as shown in FIG. 11, release tape 41 may be applied from an applicator or roll 42 as the granule-coated sheet 40 moves around a slate drum. While the granule-coated sheet 40 is inverted, backdust is applied to the back surface of the sheet. The backdust is supplied from a backdust applicator 44.

After the application of the back dust from the backdust applicator 44, the back side of the granule-covered sheet 40 may optionally be passed through a parting agent composition applicator 46. The parting agent composition applicator 46 applies the parting agent composition to the back side of the granule-covered sheet 40. While a single parting agent composition applicator 46 is shown, one or more parting agent composition applicators 46 may be used to apply a secondary release section and optionally a primary release section (in the absences of release tape). Further, additional parting agent composition applicators may be used to apply a polymer support section prior to the inclusion of the parting material. Although FIG. 11 illustrates application of the parting agent composition by spraying via parting agent composition applicator 46, parting agent composition applicator 46 may take other forms or apply different methods of application including, but not limited to, roll coating, flood coating, reverse roll coating, or any other suitable method for applying the liquid-applied parting agent. Further, as indicated above, the parting agent material may be applied neat or in a solid form. After the parting agent composition is applied to the back side of the shingle the carrier solvent (if included) may be removed to produce the parting material, for example, though the heat of the hot asphalt or a separate heating element (not shown).

The granule-covered sheet 40 may subsequently be fed through a rotary pattern cutter 52, which includes a bladed cutting cylinder 54 and a backup roll 56, as shown in FIG. 11. If desired, the pattern cutter 52 may cut a series of cutouts in the tab portion of the granule-covered sheet 40 and cut a series of notches in the underlay portion of the granule-covered sheet 40.

The pattern cutter 52 may also cut the granule-covered sheet 40 into a continuous underlay sheet 66 and a continuous overlay sheet 68. The underlay sheet 66 may be directed to be aligned beneath the overlay sheet 68, and the two sheets may be laminated together to form a continuous laminated sheet 70. As shown in FIG. 11, the continuous underlay sheet 66 may be routed on a longer path than the path of the continuous overlay sheet 68. Further downstream, the continuous laminated sheet 70 may be passed into contact with a rotary length cutter 72 that cuts the laminated sheet into individual laminated shingles 74.

In any of the exemplary embodiments, an anti stick coating may be applied at one or more locations along the apparatus 10. For example, the anti-stick coating may be applied by anti-sticking coating composition applicator 92 after the granule-covered sheet 40 exits the slate drum. Typically, in this example the asphalt is still hot as the anti-stick coating is applied. In another example, the antistick coating may be applied by anti-sticking coating composition applicator 94 prior to the granule-covered sheet 40 entering rotary pattern cutter 52. In this example, the anti-sticking coating composition applicator 94 may apply the anti-sticking coating composition before or after the asphalt has cooled. In another example, the antistick coating may be applied by anti-sticking coating composition applicator 94 to the continuous laminated sheet 70 after it is formed by lamination. Although FIG. 11 illustrates application of the anti-stick coating composition by spraying via anti-stick coating one or more of anti-stick coating composition applicators 92, 94, or 96, the anti-stick coating composition applicators 92, 94, or 96 may each take other forms or apply different methods of application including, but not limited to, roll coating, flood coating, reverse roll coating, or any other suitable method for applying the anti-sticking coating composition. As noted above, the coated shingle may include a first anti-stick coating and a second anti-stick coating. In embodiments, where a first anti-stick coating and a second anti-stick are applied to a shingle, multiple anti-stick coating composition applicators may be employed where one or more of anti-stick coating composition applicators 92, 94, or 96 are shown in the apparatus 10. Alternatively, first anti-stick coating may be applied by of the anti-stick coating composition applicators 92, 94, or 96 and the second anti-stick coating may be applied by a different anti-stick coating composition applicator selected from anti-stick coating composition applicators 92, 94, or 96.

In order to facilitate synchronization of the cutting and laminating steps, various sensors and controls may be employed. For example, sensors, such as photo eyes 86 and 88 may be used to synchronize the continuous underlay sheet 66 with the continuous overlay sheet 68. Sensors 90 may also be used to synchronize the notches and cutouts of the continuous laminated sheet with the end cutter or length cutter 72.

The above description of specific embodiments has been given by way of example. Any combination or sub-combination of the described shingle features may be combined to form a shingle. From the disclosure given, those skilled in the art will not only understand the general inventive concepts and attendant advantages but will also find apparent various changes and modifications to the structures and methods disclosed. For example, the general inventive concepts are not typically limited to any particular roofing application. Thus, for example, use of the inventive concepts to both residential and commercial roofing applications, are within the spirit and scope of the general inventive concepts. As another example, although the embodiments disclosed herein have been primarily directed to asphalt-based roofing shingles, the general inventive concepts could be readily extended to any roofing material which could benefit from the general inventive concepts described herein. Furthermore, the general inventive concepts could be readily applied to various shingle designs, such as for example, single layer, three tab shingles or multi-layer, laminate shingles. It is sought, therefore, to cover all such changes and modifications as fall within the spirit and scope of the general inventive concepts, as described and claimed herein, and equivalents thereof.

EXAMPLES

Example 1

Figure 12:
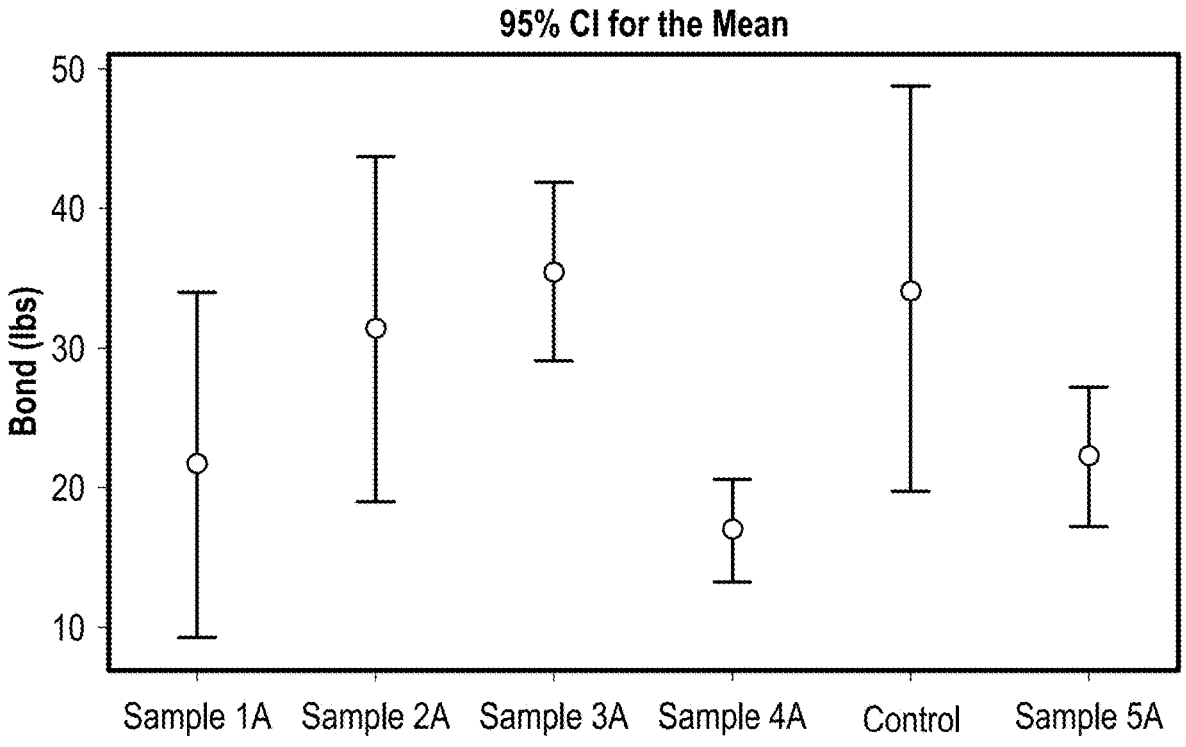
FIG. 12 is a graph showing the bond strength of coated and uncoated shingles that include a reinforcement strip in the nail zone.

To demonstrate that the use of the anti-stick coating does not negatively impact the bond strength between two bonded shingles, a bond strength test was performed as directed in the ASTM D6381M-155 (2020), with modifications to include a pull rate of 12 inches per minute (for the ASTM specifies 5 inches per minute) and 5 test specimens (the ASTM specifies 10 samples). A first set of coated samples were prepared on shingles that included a reinforcement material in the nail zone. The samples included the following anti-stick coatings: Sample 1A: acrylic dispersion, Sample 2A: a first core-shell self-crosslinking acrylate polymer, Sample 3A: a second core-shell self-crosslinking acrylate polymer, Sample 4A: calcium stearate, and Sample 5A: maleated polypropylene. Each anti-stick coating was applied with an average loading amount of 0.086 kg/m$^2$±0.05 kg/m$^2$ and was applied to the headlap and the reinforcement material in the nail zone. The coated shingles were compared to an uncoated Control that was otherwise identical to the sample shingles, but without the anti-stick coating. As illustrated in FIG. 12, Samples 2a and 3a perform particularly well, with bond strengths comparable or better than the Control. Each of the coated shingles demonstrated bond strengths above 10 lbs, and a majority of the bond strengths were above 20 lbs.

A second set of coated samples were prepared on shingles without a reinforcement material in the nail zone. The samples included the following anti-stick coatings: Sample 1B: acrylic dispersion, Sample 2B: a first core-shell self-crosslinking acrylate polymer, Sample 3B: a second core-shell self-crosslinking acrylate polymer, Sample 4B: calcium stearate, and Sample 5B: maleated polypropylene. Each coating was applied with an average loading amount of 0.086 kg/m$^2$±0.05 kg/m$^2$. The coating was applied to the headlap and nail zone.

Figure 13:
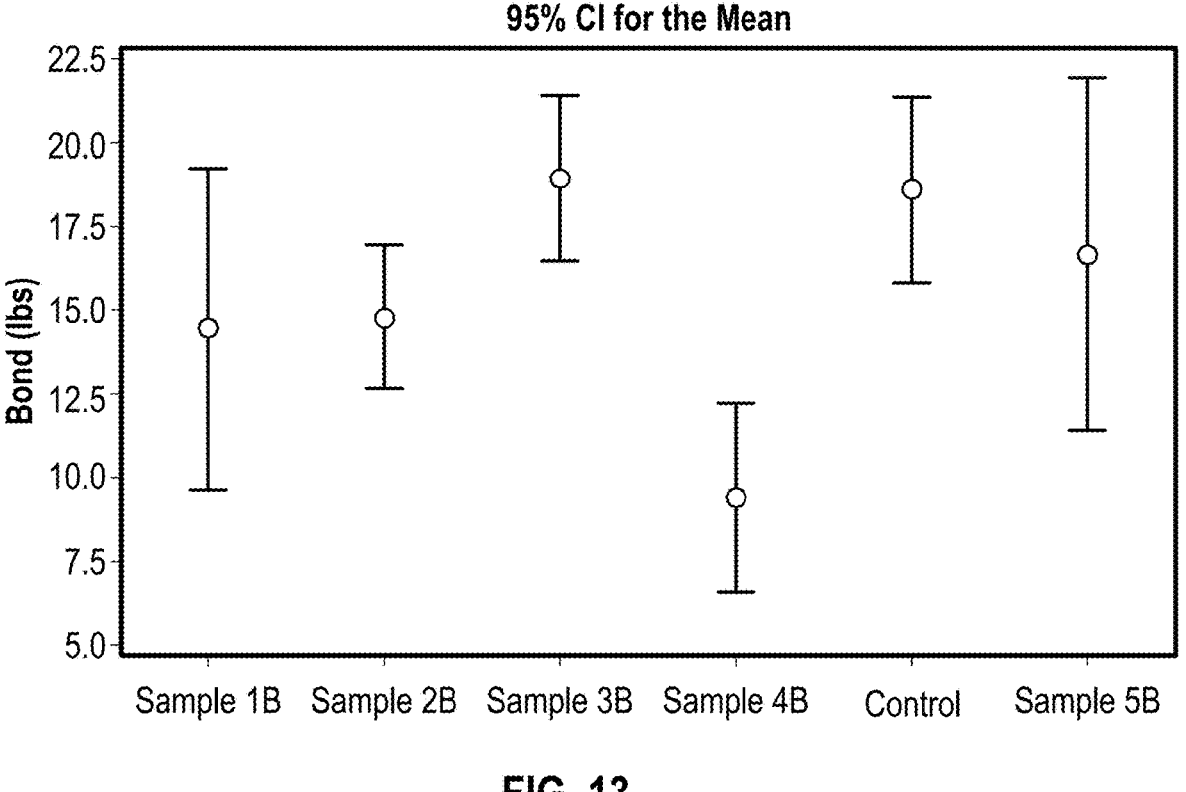
FIG. 13 is a graph showing the bond strength of coated and uncoated shingles.

The coated samples were compared to an uncoated control that was otherwise identical to the sample shingles, but without the anti-stick coating. The results are shown in FIG. 13.

Example 2

A lap shear test was performed to determine the force required to separate two shingles stacked in a front-to-front orientation. A set of shingles was prepared comprising an asphalt coated substrate with roofing granules embedded in the asphalt. The shingles were then coated with 0.086 kg/m$^2$±0.05 kg/m$^2$ of an anti-stick coating. The following anti-stick coatings were used to coat each shingle sample: Sample 6 acrylic dispersion, Sample 7: calcium stearate, and Sample 8: maleated polypropylene. The coated shingles were compared to an uncoated control that was otherwise identical to the sample shingles, but without the anti-stick coating (the Control).

The coated shingles were prepared for testing by placing the front side of a first 6 inch long and 1⅞ inch wide specimen of a shingle against the front side of a second 6 inch long and 1⅞ inch wide specimen of a shingle, such that the shingles overlapped in a 2-inch region. For each Sample, the first specimen included an anti-stick coating on the surface of the granules and asphalt in the overlapping region, while the second specimen did not include an anti-stick coating on the surface of the granules and asphalt.

A weight of 30 lbs. was applied to the top of the two shingle specimen in each Sample, which were oriented front-to-front for 24 hours at 149±2° F. The two-shingle specimen were then separated on a tensile tester, such as an Instron tensile tester, with crosshead speed of 2 inches per minute with a gauge length of 7 inches to calculate the maximum breaking force required to separate the two specimens.

Figure 14:
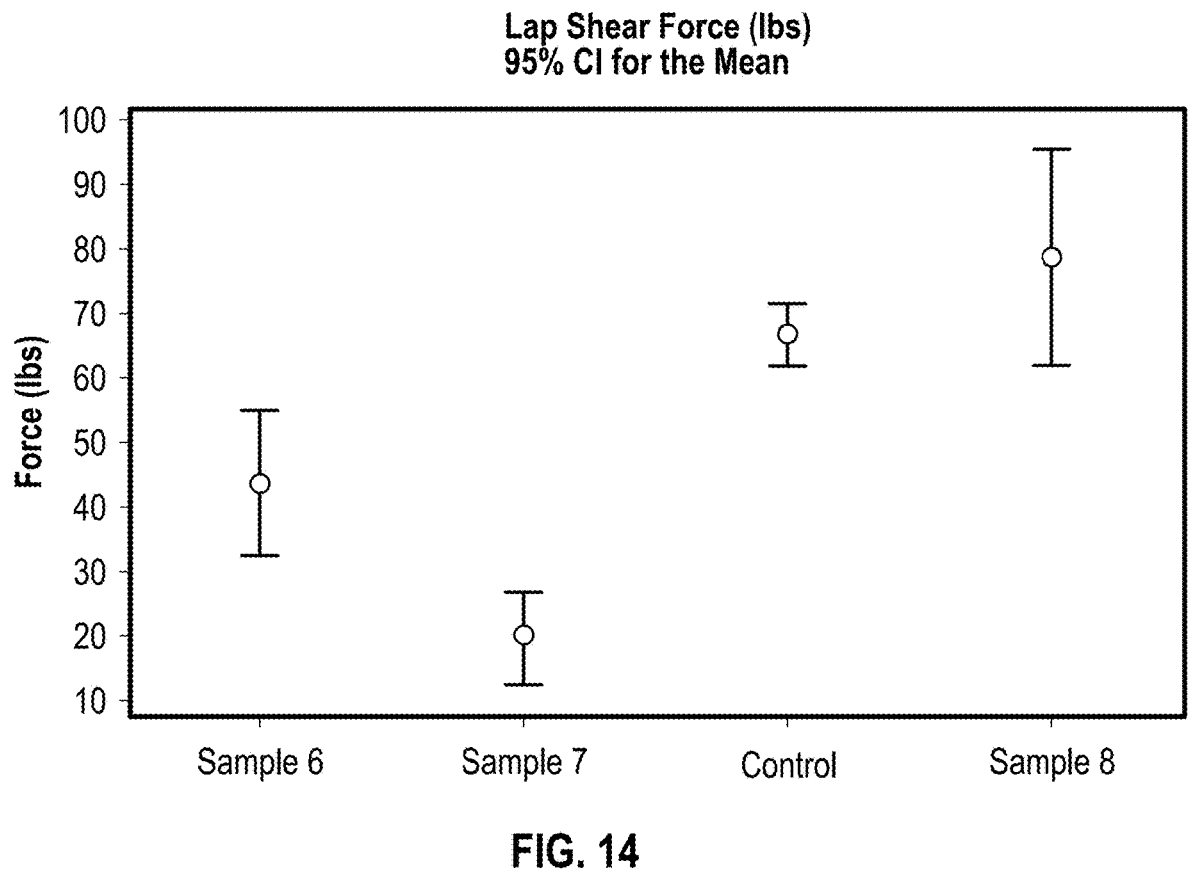

FIG. 14 illustrates the Lap Shear Test results from each Sample, with Samples 6 and 7 illustrating a substantial reduction in lap shear (less than 50 lbs.). Sample 7 demonstrated the largest reduction in lap shear with a maximum breaking force of about 20 lbs.

Figure 16:
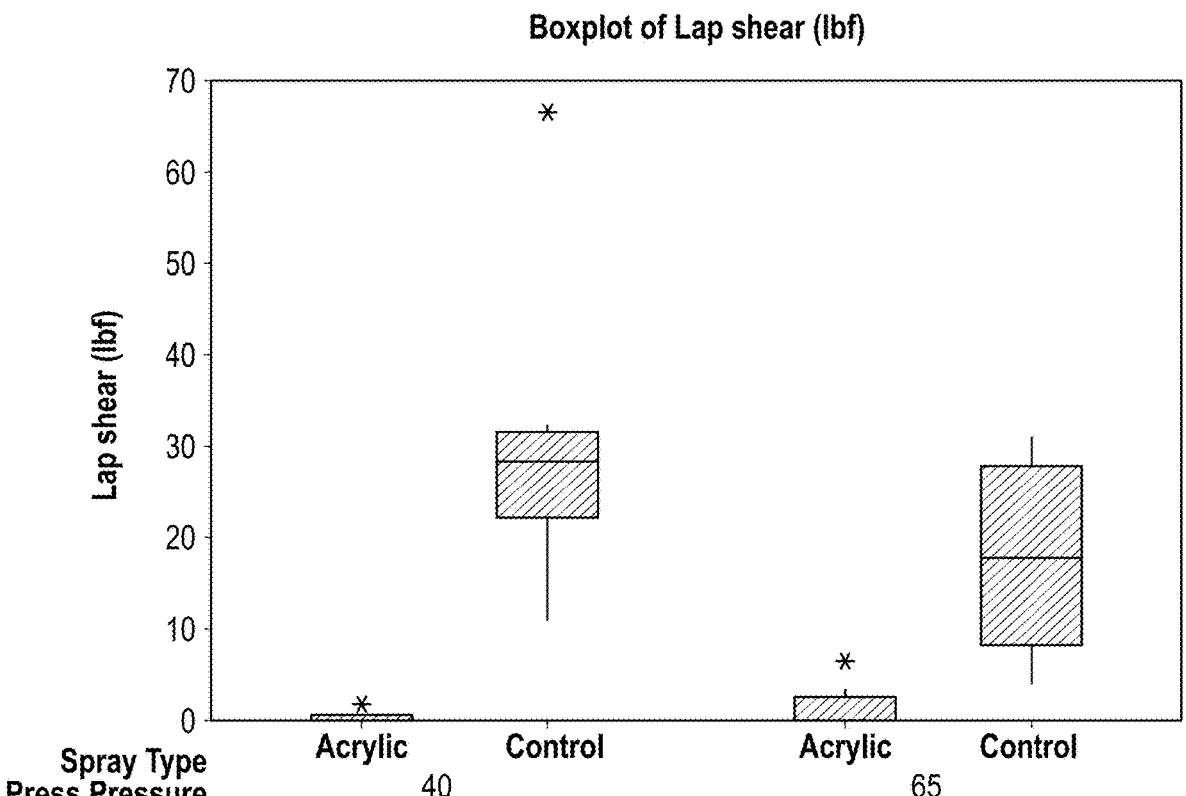
FIG. 16 is a graph showing the lap shear of coated shingles.

A Lap Shear test was performed as described above, this time using an SBS-polymer modified asphalt coating and varied pressure. The SBS-polymer modified shingle samples were then coated with roofing granules and two samples were coated with 0.1 to 0.2 kg/m2 of an acrylic dispersion anti-stick coating. The Controls were otherwise identical shingle samples that were not coated with the anti-stick coating. FIG. 16 illustrates the reduction in lap shear seen when the shingle samples were coated with the acrylic anti-stick coating. Even at a pressure of 65 lbs., the maximum breaking force was less than 5 lbs., compared to the Control, with a maximum breaking force of at least 10 lbs.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

What is claimed is:

1. A coated shingle comprising:

a substrate comprising a first surface defining an upper side of the shingle and an opposed a second surface defining a lower side of the shingle, wherein the substrate includes a headlap portion, a tab portion, and a nail zone situated between the headlap portion and the tab portion;

asphalt impregnated within the substrate, such that a first asphalt coating is present on the first surface of the substrate and a second asphalt coating is present on the second surface of the substrate;

an adhesive disposed upon the lower side of the shingle;

a plurality of granules embedded in the first asphalt coating, forming a top face that includes the granules and a partially exposed first asphalt coating; and 0.0005 kg/m2 to 1 kg/m$^2$ of at least one anti-stick coating located on the first surface of the shingle on at least one of the headlap portion and the tab portion.

2. The coated shingle of claim 1, wherein the coated shingle further includes a primary release section located on the lower side of the coated shingle, where the primary release section comprises a parting agent material, the parting agent material being included on the shingle in an amount from 0.0005 kg/m2 to 1 kg/m$^2$.

3. The coated shingle of claim 1, wherein the anti-stick coating is selected from metal salts of fatty acids, silanes, siloxanes, silicones, silicone rubbers, silica nanoparticles, polysilazanes, waxes, styrene-butadiene rubbers (SBR), esters of acrylic polymers, maleated polypropylene, polyolefins, acrylic, acrylic copolymers, self-crosslinking acrylate polymers, vinyl acetates, polyurethanes, acrylated urethanes, fluoropolymers, poly propyl methacrylate, poly propyl methacrylate with fluorosalts, and combinations thereof.

4. The coated shingle of claim 3, wherein the acrylic polymers are core-shell polymers or self-crosslinking polymers.

5. The coated shingle of claim 1, wherein the coated shingle is a laminated shingle.

6. The coated shingle of claim 1, wherein the anti-stick coating is located on at least one of the headlap portion and the tab portion.

7. The coated shingle of claim 1, wherein the anti-stick coating is applied to the headlap portion and extends from a first edge of the coated shingle to a second edge of the coated shingle and has a width in the range of 1 cm to 16 cm.

8. The coated shingle of claim 1, where the anti-stick coating at least partially covers the nail zone.

9. The coated shingle of claim 1, where the coated shingle includes a strip of reinforcement material in the nail zone.

10. The coated shingle of claim 1, wherein a coated region of the coated shingle exhibits a bond strength to a sealant on a second shingle greater than 3 lbs. of force.

11. The coated shingle of claim 1, wherein the anti-stick coating is a first anti-stick coating located on the headlap portion and a second anti-stick coating is located on the tab portion, and the first anti-stick coating and the second anti-stick coating are different.

12. The coated shingle of claim 1, wherein the anti-stick coating has a surface energy that is in the range of 10 mN/m to 70 mN/m.

13. The coated shingle of claim 1, wherein the percent difference in surface energy between the anti-stick coating and the granules is less than 35%.

14. The coated shingle of claim 1, where the anti-stick coating at least partially covers the nail zone, and the anti-stick coating the provides a bond strength to a sealant on an adjacent shingle greater than 3 lbs. of force and a lap shear strength less than 50 1bs.

15. A stack of coated shingles comprising:

at least a first coated shingle and a second coated shingle, each coated shingle comprising:

a substrate comprising a first surface defining an upper side of the shingle and an opposed a second surface defining a lower side of the shingle, wherein the substrate includes a headlap portion, a tab portion, and a nail zone situated between the headlap portion and the tab portion;

asphalt impregnated within the substrate, such that a first asphalt coating is present on the first surface of the substrate and a second asphalt coating is present on the second surface of the substrate;

an adhesive on the lower side of the shingle;

a plurality of granules embedded in the first asphalt coating, forming a top face that includes the granules and a partially exposed first asphalt coating; and 0.0005 kg/m2 to 1 kg/m2 of at least one anti-stick coating located on the first surface of the shingle on at least one of the headlap portion and the tab portion, wherein the first coated shingle and the second coated shingle are oriented in a stack such that the upper side of the first coated shingle is in contact with the upper side of the second coated shingle.

16. The stack of coated shingles of claim 15, wherein each of the first coated shingle and second coated shingle further includes a primary release section located on the lower side of the coated shingle, where the primary release section comprises a parting agent material, the parting agent material being included on the shingle in an amount from 0.0005 kg/m2 to 1 kg/m$^2$.

17. The stack of coated shingles of claim 15, wherein the lap shear force required to separate the first coated shingle from the second coated shingles is less than 80 lbs. of force.

18. The stack of coated shingles of claim 15, wherein a bond strength between the nail zone of the first coated shingle and the adhesive of the second coated shingle is greater than 3 lbs. of force, according to modified ASTM D6381M-15 (2020).

19. A method for stacking coated shingles comprising:

(i) providing a plurality of coated shingles, wherein each of the coated shingles comprise:

a substrate comprising a first surface defining an upper side of the shingle and an opposed a second surface defining a lower side of the shingle, wherein the substrate includes a headlap portion, a tab portion, and a nail zone situated between the headlap portion and the tab portion;

asphalt impregnated within the substrate, such that a first asphalt coating is present on the first surface of the substrate and a second asphalt coating is present on the second surface of the substrate;

an adhesive on the lower side of the shingle;

a plurality of granules embedded in the first asphalt coating, forming a top face that includes the granules and a partially exposed first asphalt coating; and 0.0005 kg/m$^2$ to 1 kg/m$^2$ of at least one anti-stick coating located on the first surface of the shingle on at least one of the headlap portion and the tab portion; and at least one release section on the lower side of the shingle; and (ii) stacking the plurality of coated shingles such that the upper side of a first coated shingle in the plurality of coated shingles is in contact with the upper side of a second coated shingle and the lower side of the first coated shingle is in contact with the lower side of a third coated shingle, such that the release section on the first coated shingle is in contact with the adhesive of the third coated shingle.

20. The method of claim 19, wherein the release section comprises a parting agent material, the parting agent material being included on the shingle in an amount from 0.0005 kg/m2 to 1 kg/m$^2$.

21. The method of claim 19, wherein the anti-stick coating is selected from metal salts of fatty acids, silanes, siloxanes, silicones, silicone rubbers, silica nanoparticles, polysilazanes, waxes, styrene-butadiene rubbers (SBR), esters of acrylic polymers, maleated polypropylene, polyolefins, acrylic, acrylic copolymers, self-crosslinking acrylate polymers, vinyl acetates, polyurethanes, acrylated urethanes, fluoropolymers, poly propyl methacrylate, poly propyl methacrylate with fluorosalts, and combinations thereof.

22. The method of claim 19, wherein the lap shear force required to separate the first coated shingle from the second coated shingles is less than 80 lbs. of force.

\* \* \* \* \*